US012273300B2

(12) United States Patent
Cao et al.

(10) Patent No.: US 12,273,300 B2
(45) Date of Patent: Apr. 8, 2025

(54) CROSS CARRIER RANDOM ACCESS CONFIGURATION

(71) Applicant: Qualcomm Incorporated, San Diego, CA (US)

(72) Inventors: Yiqing Cao, Beijing (CN); Bin Han, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/762,514

(22) PCT Filed: Sep. 24, 2020

(86) PCT No.: PCT/CN2020/117389
§ 371 (c)(1),
(2) Date: Mar. 22, 2022

(87) PCT Pub. No.: WO2021/057841
PCT Pub. Date: Apr. 1, 2021

(65) Prior Publication Data
US 2022/0360419 A1 Nov. 10, 2022

(30) Foreign Application Priority Data
Sep. 24, 2019 (WO) ................ PCT/CN2019/107452

(51) Int. Cl.
*H04L 5/00* (2006.01)
*H04W 74/0833* (2024.01)
(52) U.S. Cl.
CPC ............ *H04L 5/0094* (2013.01); *H04L 5/001* (2013.01); *H04W 74/0833* (2013.01)
(58) Field of Classification Search
None
See application file for complete search history.

(56) References Cited

U.S. PATENT DOCUMENTS

2009/0040396 A1 2/2009 Aso
2017/0164400 A1* 6/2017 Fong .................. H04W 72/23
(Continued)

FOREIGN PATENT DOCUMENTS

CN 101646234 A 2/2010
CN 101772185 A 7/2010
(Continued)

OTHER PUBLICATIONS

Supplementary European Search Report—EP20869183—Search Authority—The Hague—Sep. 1, 2023 (195440EP).
(Continued)

*Primary Examiner* — Kodzovi Acolatse
(74) *Attorney, Agent, or Firm* — Holland & Hart LLP/Qualcomm

(57) ABSTRACT

Methods, systems, and devices for wireless communications are described. Random access channel (RACH) occasions may be scheduled on each component carrier (CC) of a carrier aggregation (CA) configuration that includes both a time division duplexing (TDD) TD Raid band and at least one frequency division duplexing (FDD) band based on a synchronization signal/physical broadcast channel block (SSB) received in the TDD band. In some cases, the TDD band may be used to configure the RACH occasions in same and/or different CCs. Additionally or alternatively, the FDD band may configure the RACH occasions on its uplink CC based on SSBs received on other CCs. Additionally, the RACH occasions may be configured such that the UE avoids unavailable uplink slots when transmitting a first RACH message in a RACH occasion.

30 Claims, 17 Drawing Sheets

(56) References Cited

U.S. PATENT DOCUMENTS

| | | | |
|---|---|---|---|
| 2018/0241526 A1 | 8/2018 | Chendamarai Kannan et al. | |
| 2018/0368181 A1 | 12/2018 | Lee et al. | |
| 2019/0069258 A1 | 2/2019 | Jeon et al. | |
| 2020/0137645 A1* | 4/2020 | Agiwal | H04L 5/0035 |
| 2020/0221506 A1* | 7/2020 | Jeon | H04W 74/0833 |
| 2020/0351801 A1* | 11/2020 | Jeon | H04W 52/48 |
| 2020/0351955 A1* | 11/2020 | Jeon | H04W 80/02 |
| 2021/0051736 A1* | 2/2021 | Jeon | H04W 76/11 |
| 2021/0289536 A1* | 9/2021 | Liu | H04W 74/0841 |
| 2022/0046724 A1* | 2/2022 | Maso | H04W 74/0833 |
| 2022/0394776 A1* | 12/2022 | Harrison | H04W 74/002 |
| 2023/0319834 A1* | 10/2023 | Liu | H04W 72/1268 |
| | | | 370/329 |

FOREIGN PATENT DOCUMENTS

| | | | | | |
|---|---|---|---|---|---|
| CN | | 102917468 A | | 2/2013 | |
| CN | | 117751611 A | * | 3/2024 | H04L 5/0051 |
| WO | WO-2012173565 A1 | | | 12/2012 | |
| WO | WO-2019104299 A1 | | | 5/2019 | |
| WO | WO-2021030804 A1 | * | | 2/2021 | H04L 1/1671 |

OTHER PUBLICATIONS

Xenakis A., et al., "A Cross-Layer-Aware FDD/TDD Carrier Aggregation Framework for LTE-A Networks", Wireless Personal Communications: An International Journal, vol. 99, Issue 2, Jan. 29, 2018, pp. 1015-1033, Sectionon 2.1, Fig. 1.

CHTTL: "Initial Random Access Management for Carrier Aggregation System", 3GPP TSG RAN WG1 Meeting#59, R1-094976, Jeju, Korea, Nov. 9-13, 2009,Nov. 13, 2009, 2 pages, section 2.

International Search Report and Written Opinion—PCT/CN2019/107452—ISA/EPO—Jun. 28, 2020 (195440WO1).

International Search Report and Written Opinion—PCT/CN2020/117389—ISA/EPO—Dec. 28, 2020 (195440WO2).

Samsung: "NR 4-Step Random Access Procedure", 3GPP Draft; 3GPP TSG-RAN WG1 NR Ad Hoc, R1-1700891, 3rd Generation Partnership Project (3GPP), Mobile Competence Centre, 650, Route Des Lucioles, F-06921 Sophia-Antipolis Cedex, France, vol. RAN WG1, No. Spokane, WA; Jan. 16, 2017-Jan. 20, 2017, Jan. 16, 2017 (Jan. 16, 2017), XP051208407, Jan. 20, 2017, 14 pages, Retrieved from the Internet: URL:http://www.3gpp.org/ftp/Meetings_3GPP_SYNC/RAN1/Docs/ [retrieved on Jan. 16, 2017], p. 11.

* cited by examiner

CROSS CARRIER RANDOM ACCESS CONFIGURATION

CROSS REFERENCE TO RELATED APPLICATIONS

The present application is a 371 national stage filing of International PCT Application No. PCT/CN2020/117389 by CAO et al., entitled "CROSS CARRIER RANDOM ACCESS CONFIGURATION," filed Sep. 24, 2020; and claims priority to International PCT Application No. PCT/CN2019/107452 by CAO et al., entitled "CROSS CARRIER RANDOM ACCESS CONFIGURATION," filed Sep. 24, 2019, each of which is assigned to the assignee hereof, and each of which is expressly incorporated by reference in its entirety herein.

BACKGROUND

The following relates generally to wireless communications, and more specifically to a cross carrier random access configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive and/or transmit subsequent communications, a UE may perform a random access channel (RACH) procedure to establish the connection with the base station. Additionally, in some cases, the UE may communicate via multiple component carriers (CCs) at the same time in a carrier aggregation (CA) configuration, where a RACH procedure is performed for each of the multiple CCs. Efficient techniques are desired for determining configuration information for one or more messages of the RACH procedure(s).

SUMMARY

The described techniques relate to improved methods, systems, devices, and apparatuses that support cross carrier random access configurations. Generally, the described techniques provide for scheduling a set of random access channel (RACH) occasions for a carrier aggregation (CA) configuration that includes a time division duplexing (TDD) band and at least one frequency division duplexing (FDD) band, where the set of RACH occasions are based on a synchronization signal (SS)/physical broadcast channel (PBCH) block (SSB) of the TDD band. For example, a user equipment (UE) may be configured to communicate via multiple component carriers (CCs) (e.g., of a single base station or multiple base stations) according to the CA configuration and may transmit a first RACH message for at least one CC during a RACH occasion of the scheduled set of RACH occasions. In some cases, RACH occasions may be configured on the TDD band in a same or different CCs as a CC on the TDD band (e.g., cross-carrier scheduling). Accordingly, when scheduling and configuring the RACH occasions on the TDD band, carrier information indicating which CCs are used for the set of RACH occasions may be transmitted to the UE. Additionally or alternatively, RACH occasions may be configured on the FDD band on an uplink CC of the FDD band based on SSBs received on a different CC (e.g., a CC using the TDD band). Accordingly, when scheduling and configuring the RACH occasions on the FDD band, CC information indicating which corresponding CCs of the uplink CC are configured with the set of RACH occasions in the FDD band may be transmitted to the UE.

Additionally, the set of RACH occasions may avoid unavailable uplink slots. For example, the UE may not be aware of which slots are unavailable, and a base station may schedule the UE to available uplink slots via the set of RACH occasions. In some cases, the base station may transmit a time division multiplexing (TDM) pattern to the UE, and the UE may determine which uplink slots are available or unavailable based on the TDM pattern and the scheduled set of RACH occasions. For example, the UE may avoid transmitting the first RACH message in an uplink slot when a scheduled RACH occasion and the TDM pattern conflict. Additionally, when the UE attempts a retransmission of the first RACH message, the base station may indicate a list of available and forbidden RACH occasions, where the UE derives a backoff timer and identifies one of the available RACH occasions based on the list when retransmitting the first RACH message. Additionally or alternatively, the UE may identify how to retransmit the first RACH message based on the TDM pattern transmitted by the base station. Techniques are also provided for the UE to identify parameters for receiving a second RACH message based on a paired band of a RACH occasion used for transmitting the first RACH message and/or identify a propagation delay for receiving the second RACH message based on the multiple CCs. Additionally, the UE may determine a transmit power for transmitting the first RACH message based on measuring a downlink slot that corresponds to the RACH occasion used to transmit the first RACH message.

A method of wireless communications at a UE is described. The method may include identifying a CA configuration for communicating with a set of CCs, the CA configuration including a TDD band and at least one FDD band, receiving a random access occasion configuration (e.g., RACH occasion configuration) scheduling a set of random access occasions (e.g., RACH occasions) for the set of CCs based on an SSB of the TDD band, and transmitting a first random access message (e.g., first RACH message) for a CC during a random access occasion of the set of random access occasions based on the random access occasion configuration.

An apparatus for wireless communications at a UE is described. The apparatus may include a processor, memory coupled with the processor, and instructions stored in the memory. The instructions may be executable by the processor to cause the apparatus to identify a CA configuration for communicating with a set of CCs, the CA configuration including a TDD band and at least one FDD band, receive a random access occasion configuration scheduling a set of random access occasions for the set of CCs based on an SSB of the TDD band, and transmit a first random access message for a CC during a random access occasion of the set of random access occasions based on the random access occasion configuration.

Another apparatus for wireless communications at a UE is described. The apparatus may include means for identifying a CA configuration for communicating with a set of CCs, the CA configuration including a TDD band and at least one FDD band, receiving a random access occasion configuration scheduling a set of random access occasions for the set of CCs based on an SSB of the TDD band, and transmitting a first random access message for a CC during a random access occasion of the set of random access occasions based on the random access occasion configuration.

A non-transitory computer-readable medium storing code for wireless communications at a UE is described. The code may include instructions executable by a processor to identify a CA configuration for communicating with a set of CCs, the CA configuration including a TDD band and at least one FDD band, receive a random access occasion configuration scheduling a set of random access occasions for the set of CCs based on an SSB of the TDD band, and transmit a first random access message for a CC during a random access occasion of the set of random access occasions based on the random access occasion configuration.

In some examples of the method, apparatuses, and non-transitory computer-readable medium described herein, receiving the random access occasion configuration may include operations, features, means, or instructions for receiving the random access occasion configuration in the TDD band, where the set of random access occasions may be configured in at least a CC of the at least one FDD band, the TDD band, or a combination thereof.

In some examples of the method, apparatuses, and non-transitory computer-readable medium described herein, receiving the random access occasion configuration further may include operations, features, means, or instructions for receiving carrier information which indicates which CCs may be used for the set of random access occasions.

In some examples of the method, apparatuses, and non-transitory computer-readable medium described herein, receiving the random access occasion configuration further may include operations, features, means, or instructions for receiving the random access occasion configuration via a radio resource control (RRC) configuration for system information, a downlink control information (DCI) configuration for a random access procedure, or a combination thereof.

In some examples of the method, apparatuses, and non-transitory computer-readable medium described herein, receiving the random access occasion configuration may include operations, features, means, or instructions for receiving the random access occasion configuration in the at least one FDD band, where one or more random access occasions of the set of random access occasions may be configured in an uplink CC of the at least one FDD band, the TDD band, or a combination thereof.

Some examples of the method, apparatuses, and non-transitory computer-readable medium described herein may further include operations, features, means, or instructions for determining the uplink CC based on the SSB of the TDD band, an additional SSB of a different CC than the uplink CC, or a combination thereof.

In some examples of the method, apparatuses, and non-transitory computer-readable medium described herein, receiving the random access occasion configuration further may include operations, features, means, or instructions for receiving CC information which indicates which corresponding CCs of the uplink CC may be configured with the one or more random access occasions in the at least one FDD band.

In some examples of the method, apparatuses, and non-transitory computer-readable medium described herein, the random access occasion configuration includes a frequency configuration for the set of random access occasions, a time configuration for the set of random access occasions, a sequence configuration for the set of random access occasions, or a combination thereof.

Some examples of the method, apparatuses, and non-transitory computer-readable medium described herein may further include operations, features, means, or instructions for receiving a second random access message (e.g., second RACH message) based on transmitting the first random access message.

Some examples of the method, apparatuses, and non-transitory computer-readable medium described herein may further include operations, features, means, or instructions for determining a propagation delay based on the CC on which the first random access message may be transmitted and an additional CC on which the second random access message may be received, and monitoring a time window for the second random access message based on the propagation delay.

In some examples of the method, apparatuses, and non-transitory computer-readable medium described herein, the propagation delay may be determined based on a first timing advance group (TAG) for the CC and a second TAG for the additional CC, the first TAG being the same or different than the second TAG.

In some examples of the method, apparatuses, and non-transitory computer-readable medium described herein, the second random access message may be received on an uplink CC that may be paired with the TDD band or the at least one FDD band based on the CC on which the first random access message may be transmitted.

Some examples of the method, apparatuses, and non-transitory computer-readable medium described herein may further include operations, features, means, or instructions for measuring a signal quality of a downlink CC that corresponds to the CC used for transmitting the first random access message, and determining a transmit power for transmitting the first random access message based on the measured signal quality.

In some examples of the method, apparatuses, and non-transitory computer-readable medium described herein, the downlink CC may be in the TDD band or the at least one FDD band.

Some examples of the method, apparatuses, and non-transitory computer-readable medium described herein may further include operations, features, means, or instructions for receiving an indication of an uplink slot for transmitting the first random access message.

Some examples of the method, apparatuses, and non-transitory computer-readable medium described herein may further include operations, features, means, or instructions for receiving a TDM pattern for transmitting the first random access message, and determining one or more available random access occasions based on the TDM pattern, where the first random access message may be transmitted in at least one of the one or more available random access occasions.

Some examples of the method, apparatuses, and non-transitory computer-readable medium described herein may further include operations, features, means, or instructions for determining to retransmit the first random access message, and transmitting the first random access message a second time based on the determination to retransmit and the TDM pattern.

In some examples of the method, apparatuses, and non-transitory computer-readable medium described herein, the TDM pattern may be received via an RRC message, a DCI configuration, or a combination thereof.

Some examples of the method, apparatuses, and non-transitory computer-readable medium described herein may further include operations, features, means, or instructions for receiving a medium access control (MAC) control element (CE) that includes a random access radio network temporary identifier, receiving a list of available and unavailable random access occasions within the MAC CE, determining a backoff timer and a retransmission configuration for the first random access message based on the list of available and unavailable random access occasions, and transmitting the first random access message a second time based on the backoff timer and the retransmission configuration.

A method of wireless communications at a base station is described. The method may include identifying a CA configuration for communicating with a UE, the CA configuration including a set of CCs in a TDD band and at least one FDD band, transmitting a random access occasion configuration (e.g., RACH occasion configuration) scheduling a set of random access occasions (e.g., RACH occasions) for the set of CCs based on an SSB of the TDD band, and receiving a first random access message (e.g., first RACH message) for a CC in a random access occasion of the set of random access occasions based on the random access occasion configuration.

An apparatus for wireless communications at a base station is described. The apparatus may include a processor, memory coupled with the processor, and instructions stored in the memory. The instructions may be executable by the processor to cause the apparatus to identify a CA configuration for communicating with a UE, the CA configuration including a set of CCs in a TDD band and at least one FDD band, transmit a random access occasion configuration scheduling a set of random access occasions for the set of CCs based on an SSB of the TDD band, and receive a first random access message for a CC in a random access occasion of the set of random access occasions based on the random access occasion configuration.

Another apparatus for wireless communications at a base station is described. The apparatus may include means for identifying a CA configuration for communicating with a UE, the CA configuration including a set of CCs in a TDD band and at least one FDD band, transmitting a random access occasion configuration scheduling a set of random access occasions for the set of CCs based on an SSB of the TDD band, and receiving a first random access message for a CC in a random access occasion of the set of random access occasions based on the random access occasion configuration.

A non-transitory computer-readable medium storing code for wireless communications at a base station is described. The code may include instructions executable by a processor to identify a CA configuration for communicating with a UE, the CA configuration including a set of CCs in a TDD band and at least one FDD band, transmit a random access occasion configuration scheduling a set of random access occasions for the set of CCs based on an SSB of the TDD band, and receive a first random access message for a CC in a random access occasion of the set of random access occasions based on the random access occasion configuration.

In some examples of the method, apparatuses, and non-transitory computer-readable medium described herein, transmitting the random access occasion configuration may include operations, features, means, or instructions for transmitting the random access occasion configuration in the TDD band, where the set of random access occasions may be configured in at least a CC of the at least one FDD band, the TDD band, or a combination thereof.

In some examples of the method, apparatuses, and non-transitory computer-readable medium described herein, transmitting the random access occasion configuration may include operations, features, means, or instructions for transmitting carrier information which indicates which CCs may be used for the set of random access occasions.

In some examples of the method, apparatuses, and non-transitory computer-readable medium described herein, transmitting the random access occasion configuration may include operations, features, means, or instructions for transmitting the random access occasion configuration via an RRC configuration for system information, a DCI configuration for a random access procedure, or a combination thereof.

In some examples of the method, apparatuses, and non-transitory computer-readable medium described herein, transmitting the random access occasion configuration may include operations, features, means, or instructions for transmitting the random access occasion configuration in the at least one FDD band, where one or more random access occasions of the set of random access occasions may be configured in an uplink CC of the at least one FDD band, the TDD band, or a combination thereof.

Some examples of the method, apparatuses, and non-transitory computer-readable medium described herein may further include operations, features, means, or instructions for determining the uplink CC based on the SSB of the TDD band, an additional SSB of a different CC than the uplink CC, or a combination thereof.

In some examples of the method, apparatuses, and non-transitory computer-readable medium described herein, transmitting the random access occasion configuration may include operations, features, means, or instructions for transmitting CC information which indicates which corresponding CCs of the uplink CC may be configured with the one or more random access occasions in the at least one FDD band.

In some examples of the method, apparatuses, and non-transitory computer-readable medium described herein, the random access occasion configuration includes a frequency configuration for the set of random access occasions, a time configuration for the set of random access occasions, a sequence configuration for the set of random access occasions, or a combination thereof.

Some examples of the method, apparatuses, and non-transitory computer-readable medium described herein may further include operations, features, means, or instructions for transmitting a second random access message (e.g., second RACH message) based on receiving the first random access message.

In some examples of the method, apparatuses, and non-transitory computer-readable medium described herein, the second random access message may be transmitted on an uplink CC that may be paired with the TDD band or the at least one FDD band based on the CC on which the first random access message may be received.

Some examples of the method, apparatuses, and non-transitory computer-readable medium described herein may further include operations, features, means, or instructions for determining one or more available uplink slots for the UE to transmit the first random access message, and transmitting an indication of an uplink slot of the one or more available uplink slots.

Some examples of the method, apparatuses, and non-transitory computer-readable medium described herein may further include operations, features, means, or instructions for transmitting a TDM pattern for the UE to transmit the first random access message, where the first random access message may be received based on the TDM pattern.

Some examples of the method, apparatuses, and non-transitory computer-readable medium described herein may further include operations, features, means, or instructions for receiving the first random access message a second time based on the TDM pattern.

In some examples of the method, apparatuses, and non-transitory computer-readable medium described herein, the TDM pattern may be transmitted via an RRC message, a DCI configuration, or a combination thereof.

Some examples of the method, apparatuses, and non-transitory computer-readable medium described herein may further include operations, features, means, or instructions for transmitting a MAC CE that includes a random access radio network temporary identifier, transmitting a list of available and unavailable random access occasions within the MAC CE, and receiving the first random access message a second time based on the list of available and unavailable random access occasions.

DETAILED DESCRIPTION

Figure 1:
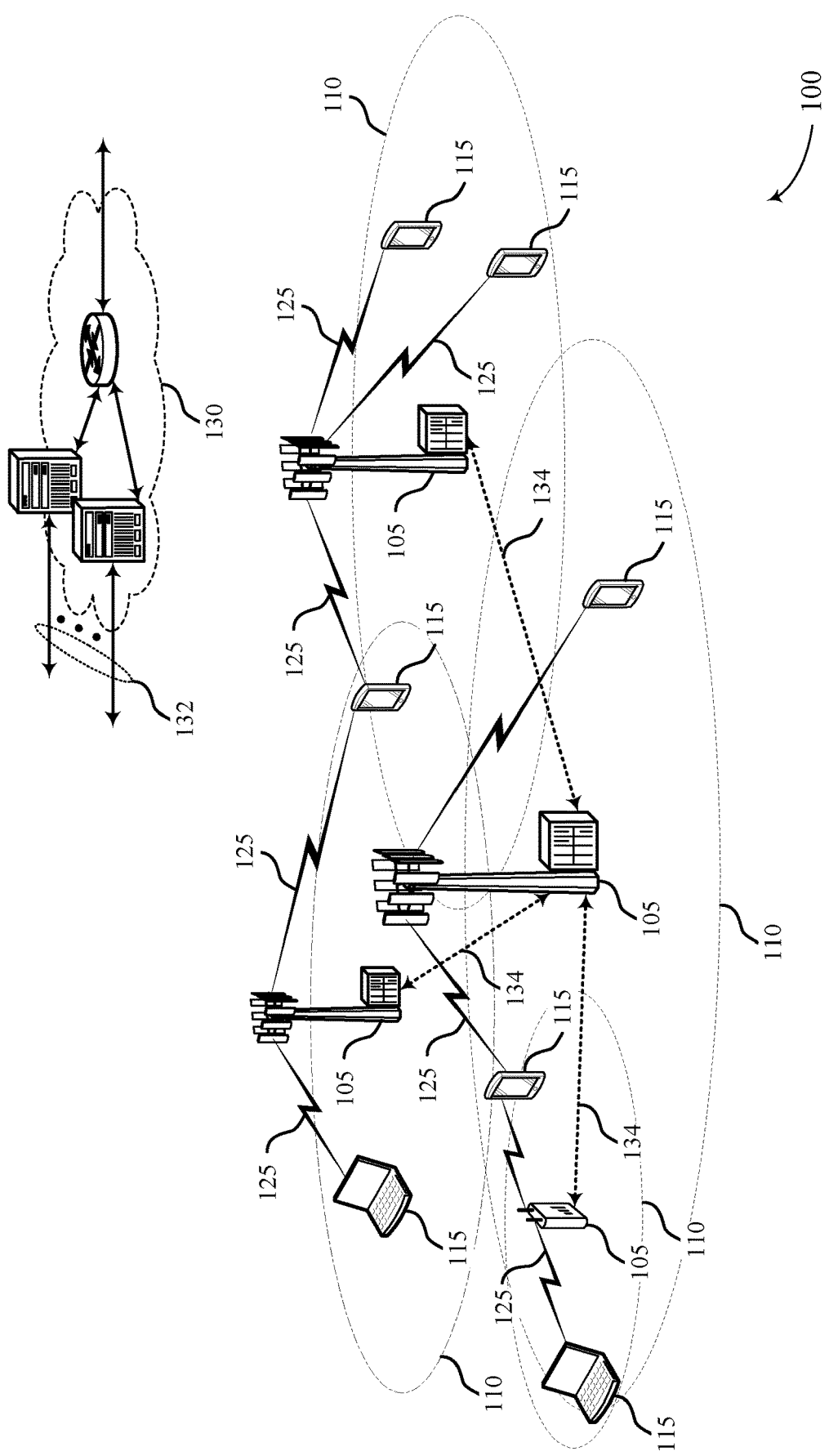
FIG. 1 illustrates an example of a system for wireless communications that supports a cross carrier random access configuration in accordance with aspects of the present disclosure.

In some wireless communications systems, a user equipment (UE) may be configured to communicate via multiple component carriers (CCs) simultaneously based on a carrier aggregation (CA) configuration. Some CA configurations support both time division duplexing (TDD) and frequency division duplexing (FDD) CCs or bands. However, the TDD and FDD bands may use different subcarrier spacings (SCSs), which results in different slot sizes for the TDD and FDD bands. As such, trying to configure different random access channel (RACH) occasions on each of the TDD and FDD bands may result in issues. For example, RACH occasions on TDD uplink slots may have longer latency based on limited uplink resources (e.g., the UE may take longer to transmit a first RACH message based on the uplink slots not occurring as often in the TDD band). Additionally, for RACH occasions on FDD uplink slots, the TDD uplink slots may interfere with the FDD uplink slots, hindering the ability to consistently schedule the RACH occasions on both the FDD and TDD bands simultaneously.

As described herein, to mitigate these issues, instead of scheduling RACH occasions on each CC (in either the FDD or TDD band) based on synchronization signal (SS)/physical broadcast channel (PBCH) blocks (SSBs) received on each respective CC, the RACH occasions may be scheduled on each CC based on an SSB received in the TDD band/spectrum. In some cases, the TDD band may be used to configure the RACH occasions in same and/or different CCs (e.g., cross-carrier scheduling). Additionally or alternatively, the FDD band may configure the RACH occasions on its uplink CC based on SSBs received on other CCs (e.g., RACH occasions are configured on the FDD band but based on SSBs received on different CCs than the uplink CC/FDD band).

The RACH occasions may be configured such that the UE avoids unavailable uplink slots when transmitting a first RACH message in a RACH occasion (e.g., based on the base station indicating which slot to use for transmitting a RACH message, based on a time division multiplexing (TDM) pattern that the UE uses to determine which slots are unavailable, etc.). Additionally, the UE may retransmit the first RACH message based on an available/forbidden RACH occasion list that the base station includes when indicating for the UE to retransmit the first RACH message or based on a TDM pattern notified when the base station configures the RACH occasions. In some cases, the UE may determine when and where to receive a RACH response message (e.g., based on a monitoring window that considers a propagation difference, a paired band for the uplink RACH occasion, etc.) and may determine a transmission power for transmitting the first RACH message (e.g., by measuring corresponding downlink slot where the RACH occasion is configured).

Aspects of the disclosure are initially described in the context of a wireless communications system. Additionally, aspects of the disclosure are illustrated through an additional wireless communications system and a process flow. Aspects of the disclosure are further illustrated by and described with reference to apparatus diagrams, system diagrams, and flowcharts that relate to cross carrier random access configuration.

FIG. 1 illustrates an example of a wireless communications system 100 that supports cross carrier random access configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of abase station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers (e.g., subcarrier spacing (SCS)). A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a PBCH) may be transmitted within different SS blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDM symbols of the second slot of the first subframe of each radio frame. It may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1 and includes access information and parameters related to common and shared channels. The periodicity of SIB2 can be set to 8, 16, 32, 64, 128, 256 or 512 radio frames.

After the UE 115 decodes SIB2, the UE 115 may transmit a RACH preamble (e.g., a message 1 (Msg1) in a four-step RACH procedure) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with a random access response (e.g., a second message (Msg2)) that provides an uplink resource grant, a timing advance, and a temporary cell radio network temporary identifier (C-RNTI). The UE 115 may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115), the UE 115 may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

In some network deployment scenarios (e.g., for NR), two-step RACH procedures and four-step RACH procedures may be used simultaneously to meet different conditions for the system. For example, the different conditions may include capacity conditions, latency conditions, reliability conditions, implementation complexity specifications, etc. Accordingly, different transmission occasions may be defined that can be used for both or either RACH procedure. For example, the different transmission occasions may include RACH occasions and uplink shared channel (e.g., physical uplink shared channel (PUSCH)) occasions. The RACH occasions may include time and frequency resources allocated for physical RACH (PRACH) transmissions. Additionally, up to 64 preamble sequences may be configured for each RACH occasions. In some cases, a two-step RACH procedure may use RACH occasions separate from a four-step RACH procedure or may share RACH occasions with a four-step RACH procedure but use different sets of preamble sequences. Additionally or alternatively, the uplink shared channel occasions (e.g., PUSCH occasions) may include time and frequency resources allocated for MsgA PUSCH transmissions (e.g., and/or for transmissions associated with the four-step RACH procedure).

As described above, a UE 115 may be configured to communicate with multiple CCs based on a CA configuration. Some CA configurations support both TDD and FDD CCs/bands. Additionally, in some cases, a super uplink deployment scenario may be used for the CA configuration, where uplink CA may be used without simultaneous uplink transmissions from greater than one CC. For example, a TDD CC/carrier (e.g., N78 band) may be used as a primary cell (PCell) for the CA configuration due to more available downlink resources for cross-carrier scheduling. Additionally, an FDD uplink CC may be used as a secondary cell (SCell) of the CA configuration but may be interrupted during TDD uplink slots.

When establishing connections with each CC for the CA configuration, the UE 115 may perform a RACH procedure with the CCs. Accordingly, the UE 115 may transmit a first RACH message (e.g., Msg1 of the four-step RACH procedure or MsgA of the two-step RACH procedure) during a RACH occasion as described above. In a supplemental uplink configuration, a RACH occasion configuration may be allowed for either a TDD uplink CC (e.g., a normal uplink (NUL) slot, N78 band, etc.) or for an FDD uplink CC (e.g., a supplementary uplink (SUL) slot, Band 1 (B1), etc.). Additionally or alternatively, for CA, a RACH occasion may be configured in both a PCell and SCell. Conventionally, a base station 105 may schedule RACH occasions on each CC (in either the FDD or TDD band) based on SSBs received on each respective CC. However, the RACH occasions may be scheduled independent of each other, which may cause different issues.

For example, for TDD uplink, a long RACH latency may be expected due to limited uplink resources. For example, fewer uplink slots may be allocated in a the TDD band, such that the UE 115 may have fewer opportunities to transmit a first RACH message, thereby increasing latency for the UE 115 to begin a RACH procedure. In some cases, for configurations where an uplink link budget is less than a downlink link budget area (e.g., greater losses are allowable for downlink transmissions than uplink transmissions), the UE 115 transmitting the first RACH message may have additional losses (e.g., similar to SUL). Additionally or alternatively, for FDD uplink, a RACH occasion configuration in the FDD band may include both the first RACH transmission and retransmissions of the first RACH message (e.g., RACH preamble) that can be interrupted by TDD uplink slots.

Wireless communications system 100 may support efficient techniques for scheduling RACH occasions on each component carrier based on an SSB received in the TDD band/spectrum for a CA configuration that includes both a TDD band and an FDD band. In some cases, the TDD band may be higher than the FDD band and more suitable for MIMO as antenna size is smaller for TDD band transmissions. For example, the TDD band may include more SSB transmissions and RACH occasion possibilities. Accordingly, to schedule RACH occasions for both the TDD and FDD bands, a base station 105 (e.g., or different network device) may use the TDD spectrum to configure RACH occasions for a UE 115 both at a same CC using the TDD spectrum and at additional CCs (e.g., using the FDD spectrum). Additionally, the base station 105 may configure RACH occasions and a backoff timer considering unavailable uplink slots (e.g., slots allocated for other uplink transmissions) and may notify UEs 115 of the configured RACH occasions and backoff timer. For the FDD band, the RACH occasions may be configured on a same uplink CC using the FDD band based on SSBs received on other CCs (e.g., RACH occasions are configured on only the FDD band but based on SSBs received on different CCs than the uplink CC/FDD band).

Figure 2:
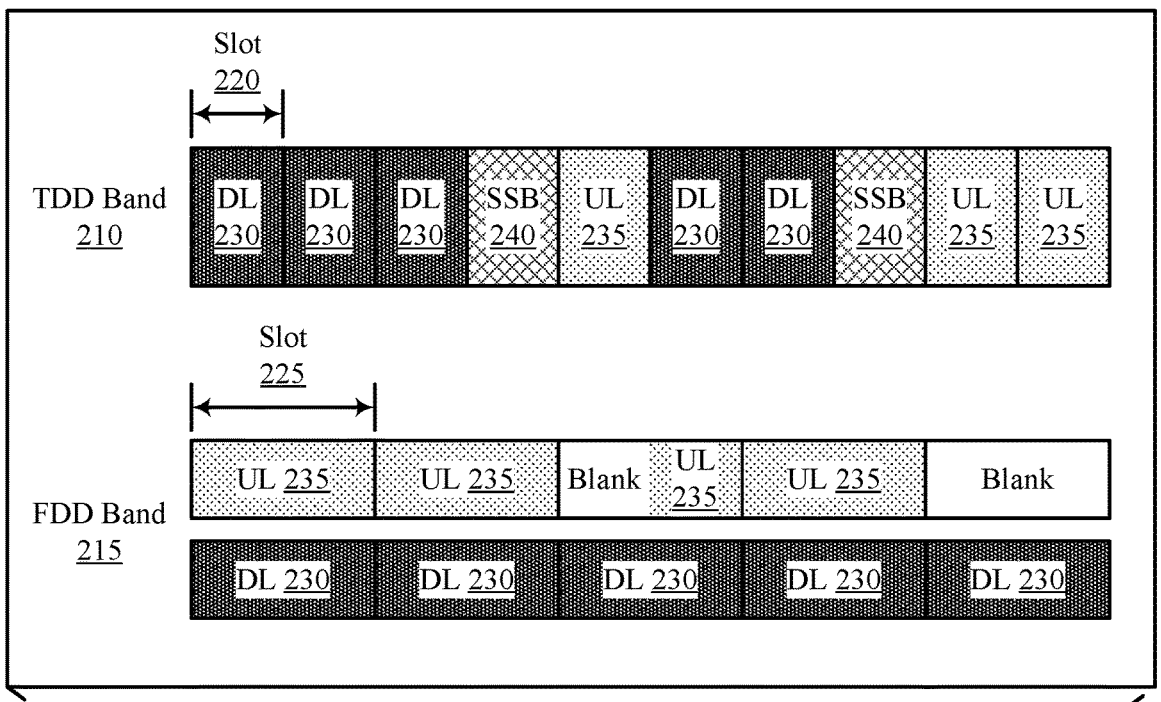
FIG. 2 illustrates an example of a wireless communications system that supports a cross carrier random access configuration in accordance with aspects of the present disclosure.

FIG. 2 illustrates an example of a wireless communications system 200 that supports cross carrier random access configurations in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. UE 115-*a* and base station 105-*a* may support a CA configuration, where UE 115-*a* communicates using multiple CCs simultaneously. As shown, UE 115-*a* may communicate with base station 105-*a* using the multiple CCs (e.g., on different cells of base station 105-*a*), where the multiple CCs are on a carrier 205. Additionally or alternatively, UE 115-*a* may communicate with multiple base stations 105 using the multiple CCs, where each CC corresponds to a different base station 105.

As described herein, the CA configuration for UE 115-*a* may include both a TDD band 210 (e.g., an N78 band) and an FDD band 215 (e.g., an NR Band 1 (B1)) of carrier 205. For example, TDD band 210 may include a number of slots 220 across a same set of frequencies allocated to different transmission directions, and FDD band 215 may include a number of slots 225 with a set of frequencies allocated to one transmission direction and a set of frequencies allocated to a second frequency direction. As shown, the slots 220 of TDD band 210 may change between downlink slots 230, uplink slots 235, and SSB slots 240 that all use the same frequencies. The downlink slots 230 may include a number of symbols (e.g., 14 symbols) allocated for downlink transmissions, the uplink slots 235 may include a number of symbols (e.g., 14 symbols) allocated for uplink transmissions, and the SSB slots 240 may include symbols allocated for a mixture of transmissions (e.g., 10 symbols for downlink transmissions, two (2) symbols for a guard period, and two (2) symbols for uplink transmissions). Additionally or alternatively, FDD band 215 may include slots 225 in a first frequency subband allocated for downlink slots 230 and a second frequency subband allocated for uplink slots 235 (e.g., and blank symbols/slots).

To establish connections on each CC for the CA configuration, UE 115-*a* may perform a RACH procedure via the CCs. Accordingly, UE 115-*a* may transmit a first RACH message (e.g., Msg1 of the four-step RACH procedure or MsgA of the two-step RACH procedure) during a RACH occasion. Base station 105-*a* may configure the RACH occasions for UE 115-*a* in both TDD band 210 and FDD band 215 (e.g., on CCs in both TDD band 210 and FDD band 215) and may signal the configuration to UE 115-*a* prior to UE 115-*a* transmitting the first RACH message. For example, base station 105-*a* may indicate a frequency, time, and sequence configuration for the RACH occasions. In some cases, UE 115-*a* may transmit the first RACH message on one CC among the multiple RACH occasions on different CCs.

However, TDD band 210 and FDD band 215 may use different SCSs, which results in different slot durations for the slots 220 and 225, respectively. For example, TDD band 210 may use a first SCS of 30 kHz that results in a slot duration of 0.5 ms for the slots 220. Alternatively, FDD band 215 may use a second SCS of 15 kHz that results in a slot duration of 1 ms for the slots 225. Accordingly, trying to configure different RACH occasions on each of TDD band 210 and FDD band 215 may result in issues as described above (e.g., longer latency, interference, etc.), hindering the ability for base station 105-*a* to consistently schedule the RACH occasions on both TDD band 210 and FDD band 215.

To mitigate these issues, wireless communications system 200 may include techniques for configuring a TDD band related RACH occasion at both uplink slots in TDD band 210 and FDD band 215. For example, for a TDD-FDD CA configuration, base station 105-*a* may configure RACH occasions for UE 115-*a* in both TDD band 210 and FDD band 215 corresponding to an SSB of the TDD spectrum. In some cases, TDD band 210 may configure RACH occasions in same CCs using TDD band 210 and/or different CCs using other frequencies (e.g., FDD band 215). That is, RACH occasions scheduled via TDD band 210 may be scheduled for multiple CCs across different frequency bands and/or carriers (e.g., cross-carrier scheduling). Accordingly, when scheduling the RACH occasions via TDD band 210, base station 105-*a* may include carrier information in the RACH occasion configuration to indicate which CCs are used for the RACH occasions (e.g., allowing RACH occasions in same and/or different carriers).

Base station 105-*a* may transmit the RACH configuration (e.g., including the carrier information) via an RRC configuration in system information, via a downlink control information (DCI) configuration for a RACH procedure, or a combination thereof. For example, when UE 115-*a* is assessing a network prior to connecting to the network via base station 105-*a*, UE 115-*a* may monitor for and receive system information from base station 105-*a* that includes the RACH occasion configuration and locations of SSB transmissions from base station 105-*a*. Additionally or alternatively, in some cases, UE 115-*a* may receive the DCI configuration including the RACH occasion configuration once connected to base station 105-*a*, where the DCI configuration may be used for subsequent RACH procedures, such as, for example, for handover procedures.

When configuring/scheduling the RACH occasions via TDD band 210, one or more uplink slots of the other CCs not using TDD band 210 (e.g., the other CCs use FDD band 215) may not be available for UE 115-*a* to transmit the first RACH message. For example, one or more uplink slots of these other CCs may be originally configured for RACH occasions but may have other uplink transmissions scheduled during the slots or may have unforeseen interferences not originally seen, thereby making the uplink slots unavailable for the first RACH message transmissions. Accordingly, base station 105-*a* may use RACH interruption avoidance techniques to enable UE 115-*a* to avoid the unavailable uplink slots (e.g., in FDD uplink slots) based on the RACH occasion configuration avoiding the unavailable uplink slots. In some cases, the RACH interruption avoidance techniques may be scheduling based (e.g., transparent to UE 115-*a*), where base station 105-*a* indicates RACH occasions on available uplink slots to UE 115-*a* (e.g., schedules UE 115-*a* on available RACH occasions). For example, UE 115-*a* may be unaware of the unavailable slots and may use the indicated slots for the RACH occasions based on the signaling from base station 105-*a* (e.g., base station 105-*a* determines the unavailable slots and ensures UE 115-*a* does not use the unavailable slots based on indicating available slots alone).

Additionally or alternatively, base station 105-*a* may transmit an explicit TDM pattern notification to UE 115-*a*, where UE 115-*a* then determines an available uplink slot in the other CCs not using TDD band 210 to transmit the first RACH message in a respective RACH occasion. For example, base station 105-*a* may configure the TDM pattern to UE 115-*a*, and UE 115-*a* may avoid uplink transmissions in an uplink slot of the other CCs when the RACH occasion and the TDM pattern configuration conflict. In some cases, base station 105-*a* may transmit the TDM pattern in either an RRC message or a DCI configuration. By signaling the TDM pattern and having UE 115-*a* make the determination of an available uplink slot, UE 115-*a* may have more flexibility to identify and may use an uplink slot for transmitting the first RACH message, and base station 105-*a* may have a reduced scheduling complexity.

In some cases, base station 105-*a* may configure RACH occasions via FDD band 215, where the RACH occasions are configured on an uplink CC that uses FDD band 215. While configuring the RACH occasions on CCs that use FDD band 215, the RACH occasions may be based on an SSB of CCs using other bands (e.g., TDD band 210). Accordingly, the RACH occasions configured via FDD band 215 may be self-scheduling (e.g., scheduled on uplink slots of FDD band 215 with FDD band 215 also used to schedule the RACH occasions). Additionally, when using FDD band 215 to transmit the RACH occasion configuration scheduling the RACH occasions, the RACH occasion configuration may include corresponding CC information in addition to the time, frequency, and sequence configuration for the RACH occasions. For example, the CC information may indicate which corresponding CCs of the uplink CC in FDD band 215 are configured with the associated RACH occasions.

After transmitting the first RACH message, UE 115-*a* may expect to receive a RACH response from base station 105-*a* (e.g., random access response (RAR) message, Msg2 of the four-step RACH procedure, MsgB of the two-step RACH procedure, etc.). For example, UE 115-*a* may expect the RACH response at TDD band 210 or FDD band 215 which is the paired band of the uplink RACH occasion used by UE 115-*a* to transmit the first RACH message. Additionally, UE 115-*a* may identify a RACH response monitoring window for monitoring for and receiving the RACH response from base station 105-*a*. For example, UE 115-*a* may consider a propagation difference between CCs for the monitoring window. If UE 115-*a* transmits the first RACH message on a first CC and then receives the RACH response from base station 105-*a* in a second CC, a delay may occur. For example, if the first CC and the second CC are part of different timing advance groups (TAGs), a timing difference may be such that UE 115-*a* cannot ignore the propagation delay when expecting/monitoring for the RACH response. Alternatively, if two CCs are in a same TAG, then UE 115-*a* may assume a propagation delta of zero (0).

Additionally, UE 115-*a* may determine an initial transmission power for the first RACH message (e.g., Msg1, MsgA, etc.) based on TDD band 210 and FDD band 215. For example, UE 115-*a* may use a measurement (e.g., power measurement, signal quality measurement, reference signal received power (RSRP), reference signal received quality (RSRQ), signal-to-noise ratio (SNR), signal-to-interference-plus-noise ratio (SINR), etc.) on a corresponding downlink slot as reference for an uplink slot used for the RACH occasion that UE 115-*a* uses for transmitting the first RACH message. In some cases, a RACH occasion on an uplink slot of FDD band 215 may use measurements of a downlink slot in FDD band 215 instead of a downlink slot of TDD band 210, even if a corresponding SSB used for configuring/scheduling the RACH occasion on the uplink slot of FDD band 215 is in TDD band 210. Additionally, a RACH occasion on an uplink slot of TDD band 210 may use measurements of a downlink slot in TDD band 210. As described above, UE 115-*a* may transmit the first RACH message only on one CC among the multiple RACH occasions on different CCs.

In some cases, UE 115-*a* may retransmit the first RACH message (e.g., RACH preamble). Accordingly, UE 115-*a* may use retransmission interruption avoidance techniques to increase chances that the retransmission is successfully received and decoded by base station 105-*a*. In some cases, base station 105-*a* may indicate the retransmission interruption avoidance techniques in the RACH response message (e.g., RAR, Msg2, MsgB, etc.). For example, base station 105-*a* may add a list of available or forbidden RACH occasions in a MAC control element (CE) when a random access radio network temporary identifier (RA-RNTI) is sent to UE 115-*a*. In some cases, the RA-RNTI may indicate to UE 115-*a* that base station 105-*a* is requesting for UE 115-*a* retransmit the first RACH message. Accordingly, UE 115-*a* may derive a backoff timer and a RACH preamble to use for the first RACH message retransmission based on the list of available or forbidden RACH occasions included in the MAC CE (e.g., with the RACH response). Additionally or alternatively, UE 115-*a* may retransmit the first RACH message based on a TDM pattern that base station 105-*a* transmits when configuring the RACH occasions (e.g., as described above). In some cases, UE 115-*a* may use a TDM pattern received in RRC signaling based on this TDM pattern having been configured to avoid interruptions for UE 115-*a*.

Figure 3:
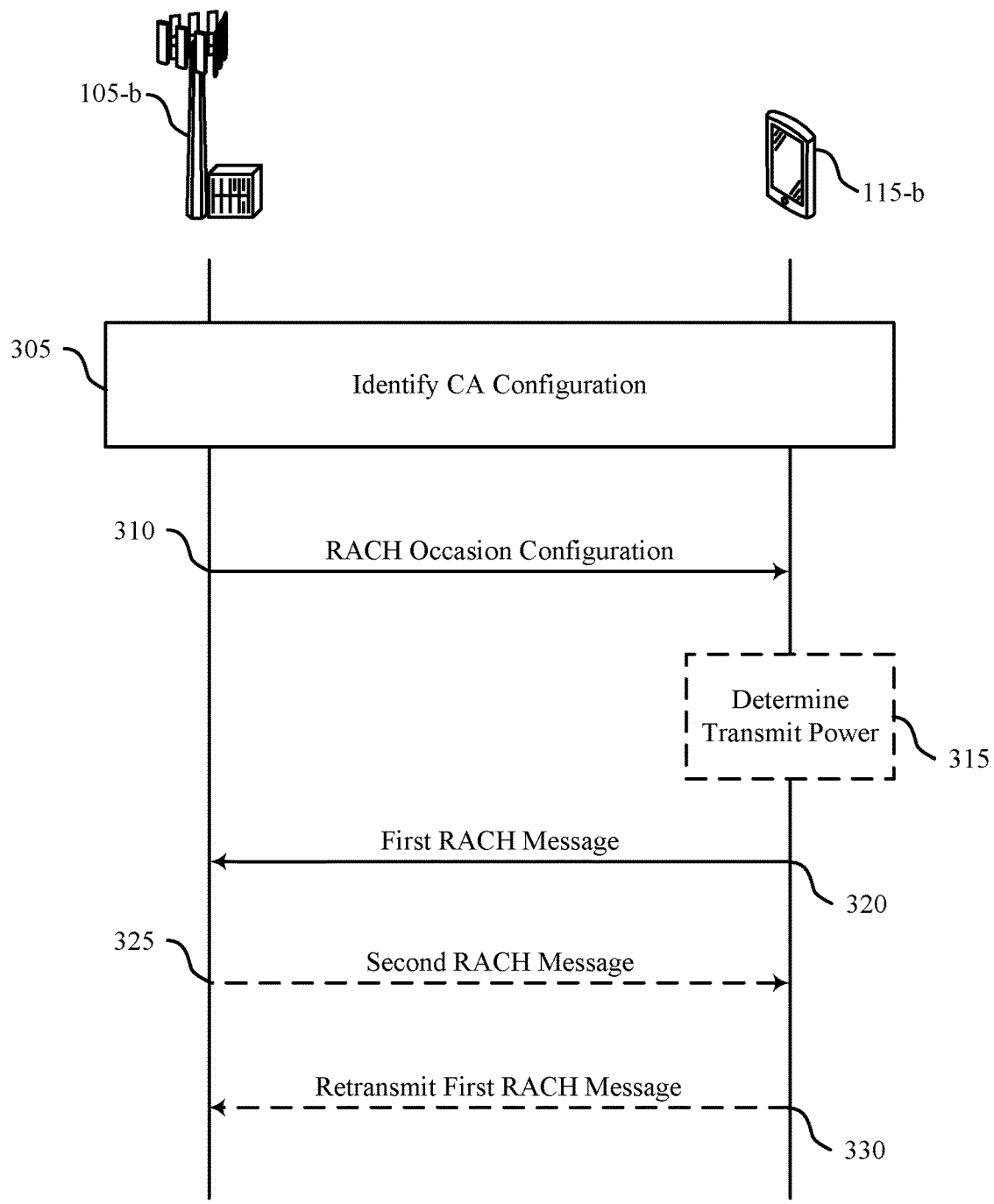
FIG. 3 illustrates an example of a process flow that supports a cross carrier random access configuration in accordance with aspects of the present disclosure.

FIG. 3 illustrates an example of a process flow 300 that supports cross carrier random access configurations in accordance with aspects of the present disclosure. In some examples, process flow 300 may implement aspects of wireless communications systems 100 and/or 200. Process flow 300 may include a base station 105-*b* and a UE 115-*b*, which may be examples of corresponding base stations 105 and UEs 115, respectively, as described above with reference to FIGS. 1 and 2.

In the following description of the process flow 300, the operations between base station 105-*b* and UE 115-*b* may be transmitted in a different order than the exemplary order shown, or the operations performed by base station 105-*b* and UE 115-*b* may be performed in different orders or at different times. Certain operations may also be left out of the process flow 300, or other operations may be added to the process flow 300. It is to be understood that while base station 105-*b* and UE 115-*b* are shown performing a number of the operations of process flow 300, any wireless device may perform the operations shown.

At 305, UE 115-*b* and base station 105-*b* may identify a CA configuration for UE 115-*b* to communicate with a set of CCs, the CA configuration including a TDD band and at least one FDD band.

At 310, UE 115-*b* may receive (e.g., from base station 105-*b*) a RACH occasion configuration scheduling a set of RACH occasions for the set of CCs based on an SSB of the TDD band. For example, the RACH occasion configuration may include a frequency configuration, a time configuration, a sequence configuration, or a combination thereof for the set of RACH occasions. In some cases, UE 115-*b* may receive the RACH occasion configuration in the TDD band, where the set of RACH occasions are configured in at least a CC of the at least one FDD band, the TDD band, or a combination thereof. Additionally, UE 115-*b* may receive carrier information which indicates which CCs are used for the set of RACH occasions. In some cases, UE 115-*b* may receive the RACH occasion configuration via an RRC configuration for system information, a DCI configuration for a RACH procedure, or a combination thereof.

Additionally or alternatively, UE 115-*b* may receive the RACH occasion configuration in the at least one FDD band, where one or more RACH occasions of the set of RACH occasions are configured in an uplink CC of the at least one FDD band, the TDD band, or a combination thereof. In some cases, UE 115-*b* may determine the uplink CC based on the SSB of the TDD band, an additional SSB block of a different CC than the uplink CC, or a combination thereof. Additionally, UE 115-*b* may receive CC information which indicates which corresponding CCs of the uplink CC are configured with the one or more RACH occasions in the at least one FDD band.

At 315, UE 115-*b* may measure a signal quality of a downlink CC that corresponds to the at least one CC used for transmitting a first RACH message and may determine a transmit power for transmitting the first RACH message based on the measured signal quality. In some cases, the downlink CC may be in the TDD band or the at least one FDD band (e.g., based on which band the at least one CC is in that is used for transmitting the first RACH message).

At 320, UE 115-*b* may transmit the first RACH message for at least one CC during a RACH occasion of the set of RACH occasions based on the RACH occasion configuration. In some cases, UE 115-*b* may receive an indication of an uplink slot for transmitting the first RACH message. Additionally or alternatively, UE 115-*b* may receive (e.g., from base station 105-*b*) a TDM pattern for transmitting the first RACH message and may determine one or more available RACH occasions based on the TDM pattern, where the first RACH message is transmitted in at least one of the one or more available RACH occasions. In some cases, the TDM pattern may be received via an RRC message, a DCI configuration, or a combination thereof.

At 325, UE 115-*b* may receive a second RACH message based on transmitting the first RACH message. In some cases, UE 115-*b* may determine a propagation delay based on the at least one CC on which the first RACH message is transmitted and an additional CC on which the second RACH message is received and may monitor a time window for the second RACH message based on the propagation delay. In some cases, the propagation delay may be determined based on a first TAG for the at least one CC and a second TAG for the additional CC, where the first TAG may be the same or different than the second TAG. Additionally, the second RACH message may be received on an uplink CC that is paired with the TDD band or the at least one FDD band based on the at least one CC on which the first RACH message is transmitted.

At 330, UE 115-*b* may determine to retransmit the first RACH message and may transmit the first RACH message a second time based on the determination to retransmit and the TDM pattern received as described above at 320. In some cases, UE 115-*b* may receive a MAC CE that includes an RA-RNTI and may receive a list of available and unavailable RACH occasions within the MAC CE and may determine a backoff timer and a retransmission configuration for the first RACH message based on the list of available and unavailable RACH occasions. Accordingly, UE 115-*b* may transmit the first RACH message a second time based at least in part on the backoff timer and the retransmission configuration.

Figure 4:
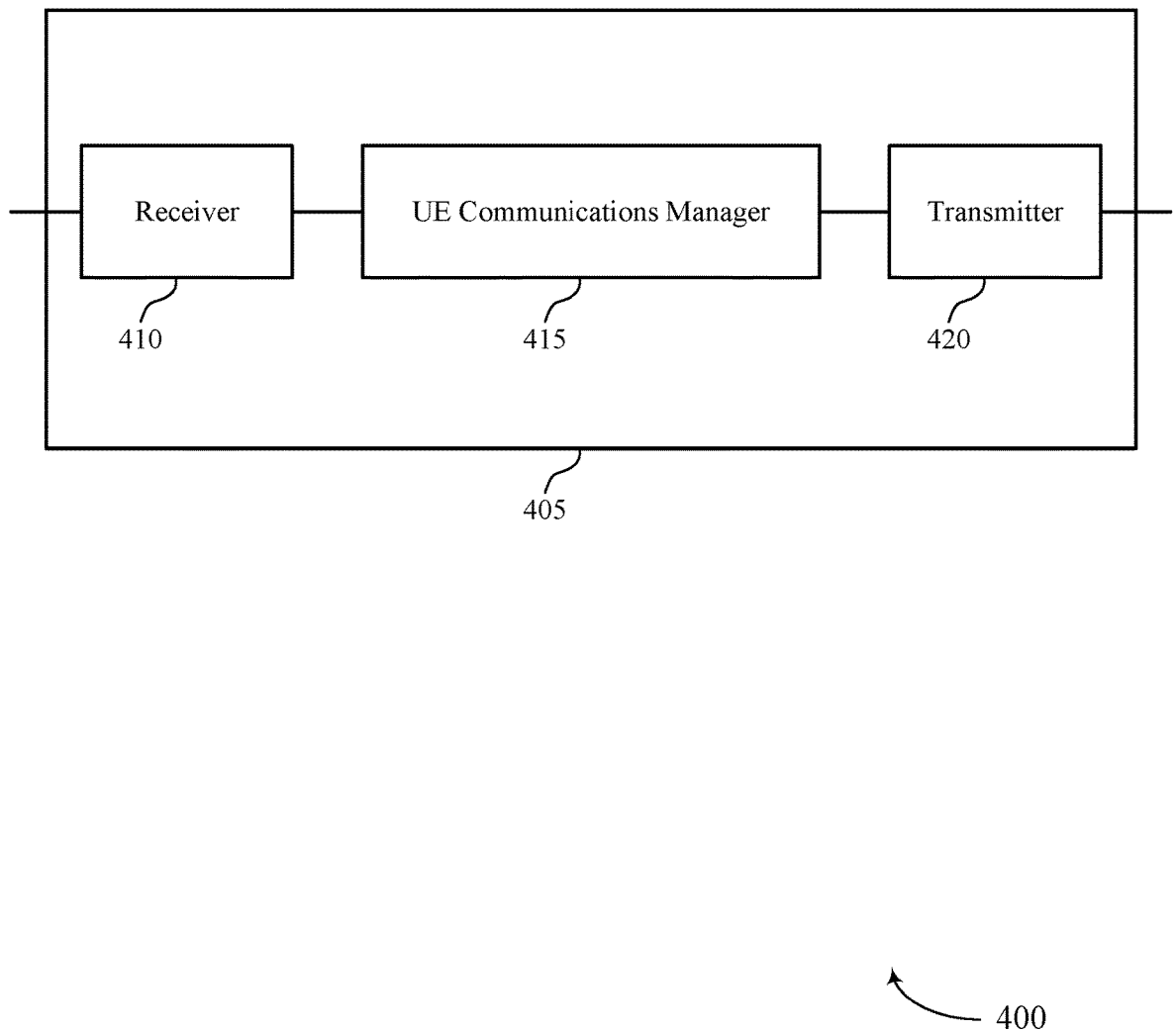
FIGS. 4 and 5 show block diagrams of devices that support a cross carrier random access configuration in accordance with aspects of the present disclosure.

FIG. 4 shows a block diagram 400 of a device 405 that supports cross carrier random access configuration in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to cross carrier random access configuration, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may identify a CA configuration for communicating with a set of CCs, the CA configuration including a TDD band and at least one FDD band. In some cases, the UE communications manager 415 may receive a random access occasion configuration (e.g., RACH occasion configuration) scheduling a set of random access occasions (e.g., RACH occasions) for the set of CCs based on an SSB of the TDD band. Additionally, the UE communications manager 415 may transmit a first random access message (e.g., first RACH message) for a CC during a random access occasion of the set of random access occasions based on the random access occasion configuration. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to perform RACH procedures (e.g., random access procedures) on different bands and CCs based on receiving a single configuration on one of the bands or CCs. Accordingly, the device 405 may more efficiently establish connections with an additional device over multiple CCs without increasing signaling overhead that may have previously arose from configuring each CC or band with respective RACH configurations.

Figure 5:
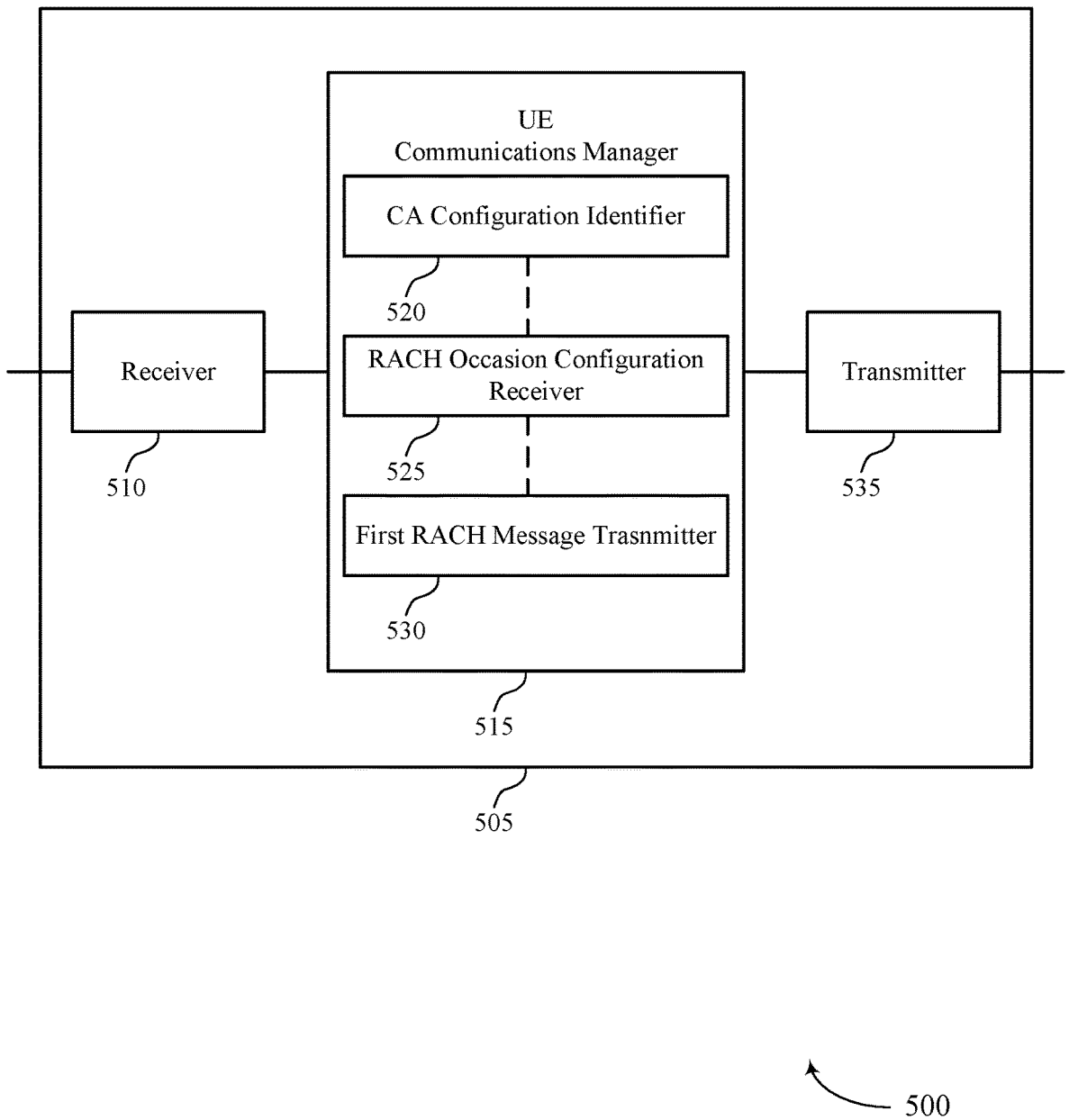

FIG. 5 shows a block diagram 500 of a device 505 that supports cross carrier random access configuration in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to cross carrier random access configuration, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a CA configuration identifier 520, a RACH occasion configuration receiver 525, and a first RACH message transmitter 530. The UE communications manager 515 may be an example of aspects of the UE communications manager 710 described herein.

The CA configuration identifier 520 may identify a CA configuration for communicating with a set of CCs, the CA configuration including a TDD band and at least one FDD band.

The RACH occasion configuration receiver 525 may receive a random access occasion configuration (e.g., RACH occasion configuration) scheduling a set of random access occasions (e.g., RACH occasions) for the set of CCs based on an SSB of the TDD band.

The first RACH message transmitter 530 may transmit a first random access message (e.g., first RACH message) for a CC during a random access occasion of the set of random access occasions based on the random access occasion configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Based on receiving a RACH occasion configuration for a set of CCs as described herein, a processor of a UE 115 (e.g., controlling the receiver 510, the transmitter 535, or the transceiver 720 as described with reference to FIG. 7) may decrease signaling overhead and decrease power consumption by performing RACH procedures across the set of CCs based on the single RACH occasion configuration rather than having separate configurations for each CC of the set of CCs.

Figure 6:
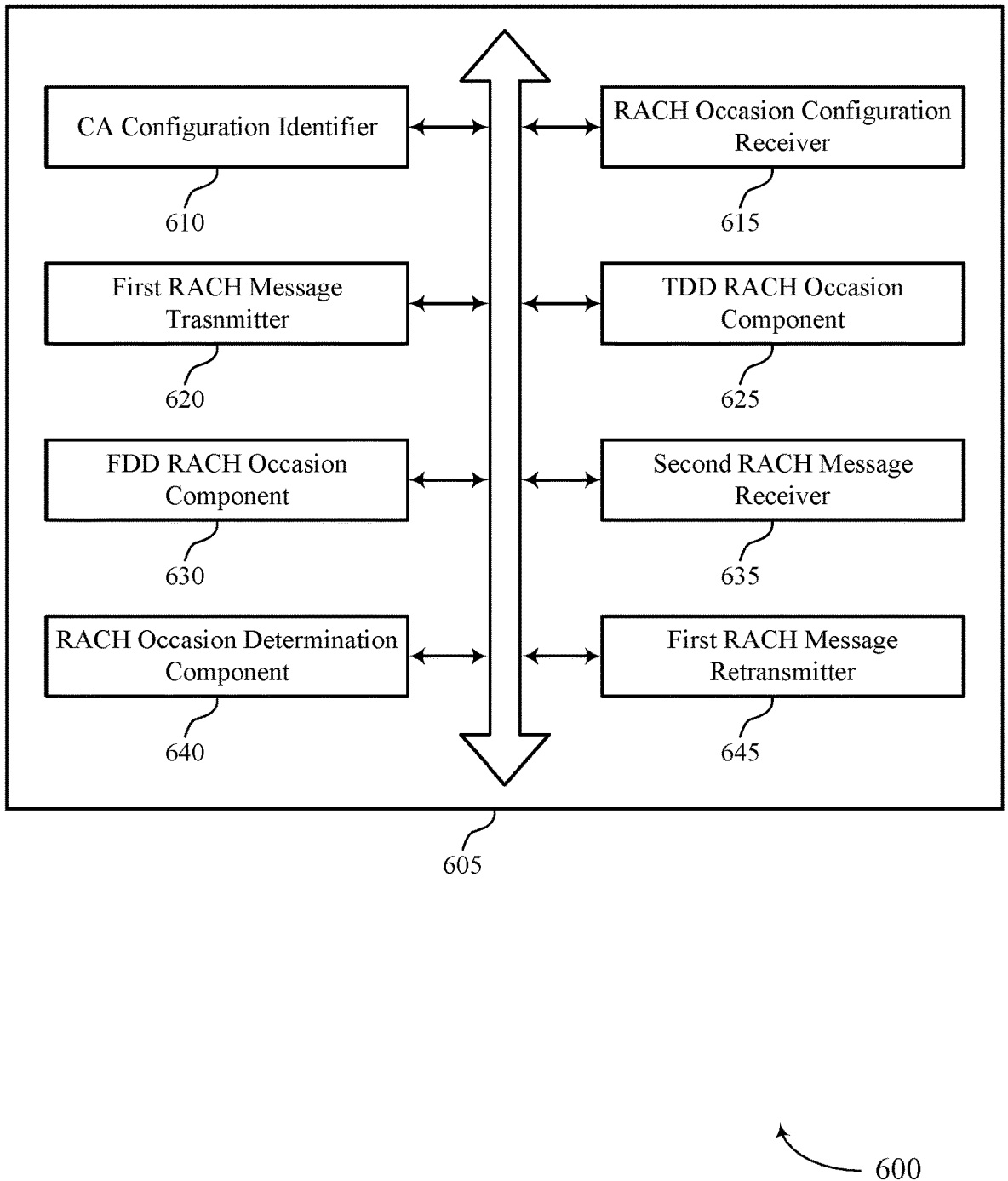
FIG. 6 shows a block diagram of a user equipment (UE) communications manager that supports a cross carrier random access configuration in accordance with aspects of the present disclosure.

FIG. 6 shows a block diagram 600 of a UE communications manager 605 that supports cross carrier random access configuration in accordance with aspects of the present disclosure. The UE communications manager 605 may be an example of aspects of a UE communications manager 415, a UE communications manager 515, or a UE communications manager 710 described herein. The UE communications manager 605 may include a CA configuration identifier 610, a RACH occasion configuration receiver 615, a first RACH message transmitter 620, a TDD RACH occasion component 625, a FDD RACH occasion component 630, a second RACH message receiver 635, a RACH occasion determination component 640, and a first RACH message retransmitter 645. Each of these modules may communicate, directly or indirectly, with one another (e.g., via one or more buses).

The CA configuration identifier 610 may identify a CA configuration for communicating with a set of CCs, the CA configuration including a TDD band and at least one FDD band.

The RACH occasion configuration receiver 615 may receive a random access occasion configuration (e.g., RACH occasion configuration) scheduling a set of random access occasions (e.g., RACH occasions) for the set of CCs based on an SSB of the TDD band. In some cases, the random access occasion configuration may include a frequency configuration for the set of random access occasions, a time configuration for the set of random access occasions, a sequence configuration for the set of random access occasions, or a combination thereof.

The first RACH message transmitter 620 may transmit a first random access message (e.g., first RACH message) for a CC during a random access occasion of the set of random access occasions based on the random access occasion configuration. In some examples, the first RACH message transmitter 620 may measure a signal quality of a downlink CC that corresponds to the CC used for transmitting the first random access message and may determine a transmit power for transmitting the first random access message based on the measured signal quality. In some cases, the downlink CC may be in the TDD band or the at least one FDD band.

The TDD RACH occasion component 625 may receive the random access occasion configuration in the TDD band, where the set of random access occasions are configured in at least a CC of the at least one FDD band, the TDD band, or a combination thereof. In some examples, the TDD RACH occasion component 625 may receive carrier information which indicates which CCs are used for the set of random access occasions. Additionally, the TDD RACH occasion component 625 may receive the random access occasion configuration via an RRC configuration for system information, a DCI configuration for a random access procedure, or a combination thereof.

The FDD RACH occasion component 630 may receive the random access occasion configuration in the at least one FDD band, where one or more random access occasions of the set of random access occasions are configured in an uplink CC of the at least one FDD band, the TDD band, or a combination thereof. In some examples, the FDD RACH occasion component 630 may determine the uplink CC based on the SSB of the TDD band, an additional SSB of a different CC than the uplink CC, or a combination thereof. Additionally, the FDD RACH occasion component 630 may receive CC information which indicates which corresponding CCs of the uplink CC are configured with the one or more random access occasions in the at least one FDD band.

The second RACH message receiver 635 may receive a second random access message (e.g., second RACH message RAR, etc.) based on transmitting the first random access message. In some examples, the second RACH message receiver 635 may determine a propagation delay based on the CC on which the first random access message is transmitted and an additional CC on which the second random access message is received and may monitor a time window for the second random access message based on the propagation delay. In some cases, the propagation delay may be determined based on a first TAG for the CC and a second TAG for the additional CC, the first TAG being the same or different than the second TAG. Additionally, the second random access message may be received on an uplink CC that is paired with the TDD band or the at least one FDD band based on the CC on which the first random access message is transmitted.

The RACH occasion determination component 640 may receive an indication of an uplink slot for transmitting the first random access message. Additionally or alternatively, the RACH occasion determination component 640 may receive a TDM pattern for transmitting the first random access message and may determine one or more available random access occasions based on the TDM pattern, where the first random access message is transmitted in at least one of the one or more available random access occasions. In some examples, the RACH occasion determination component 640 may determine to retransmit the first random access message and may transmit the first random access message a second time based on the determination to retransmit and the TDM pattern. In some cases, the TDM pattern may be received via an RRC message, a DCI configuration, or a combination thereof.

The first RACH message retransmitter 645 may receive a MAC CE that includes an RA-RNTI. In some examples, the first RACH message retransmitter 645 may receive a list of available and unavailable random access occasions within the MAC control element and may determine a backoff timer and a retransmission configuration for the first random access message based on the list of available and unavailable random access occasions. Accordingly, the first RACH message retransmitter 645 may transmit the first random access message a second time based on the backoff timer and the retransmission configuration.

Figure 7:
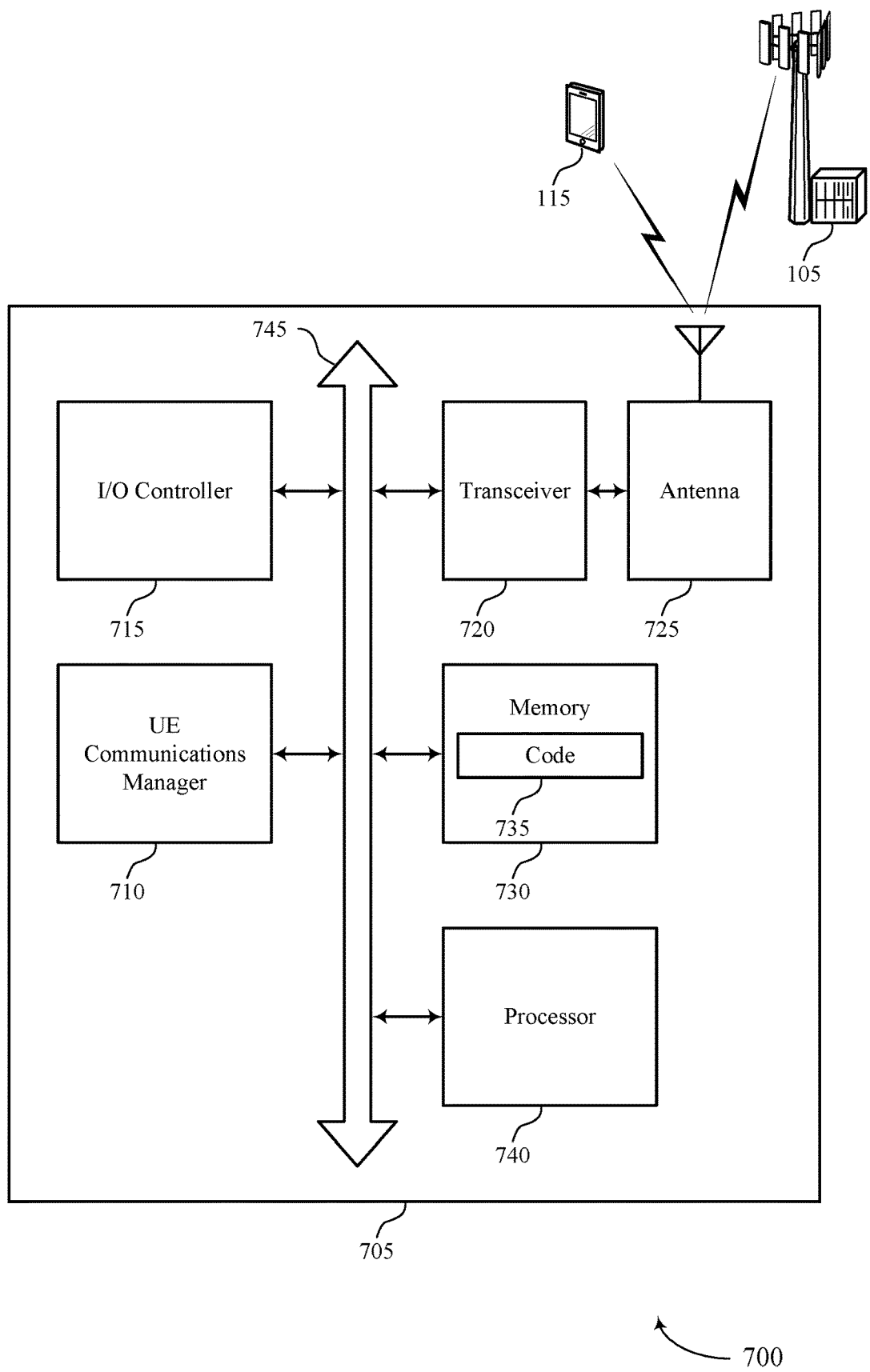
FIG. 7 shows a diagram of a system including a device that supports a cross carrier random access configuration in accordance with aspects of the present disclosure.

FIG. 7 shows a diagram of a system 700 including a device 705 that supports cross carrier random access configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be coupled via one or more buses (e.g., bus 745).

The UE communications manager 710 may identify a CA configuration for communicating with a set of CCs, the CA configuration including a TDD band and at least one FDD band. In some cases, the UE communications manager 710 may receive a random access occasion configuration scheduling a set of random access occasions for the set of CCs based on an SSB of the TDD band. Additionally, the UE communications manager 710 may transmit a first random access message for a CC during a random access occasion of the set of random access occasions based on the random access occasion configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting cross carrier random access configuration).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
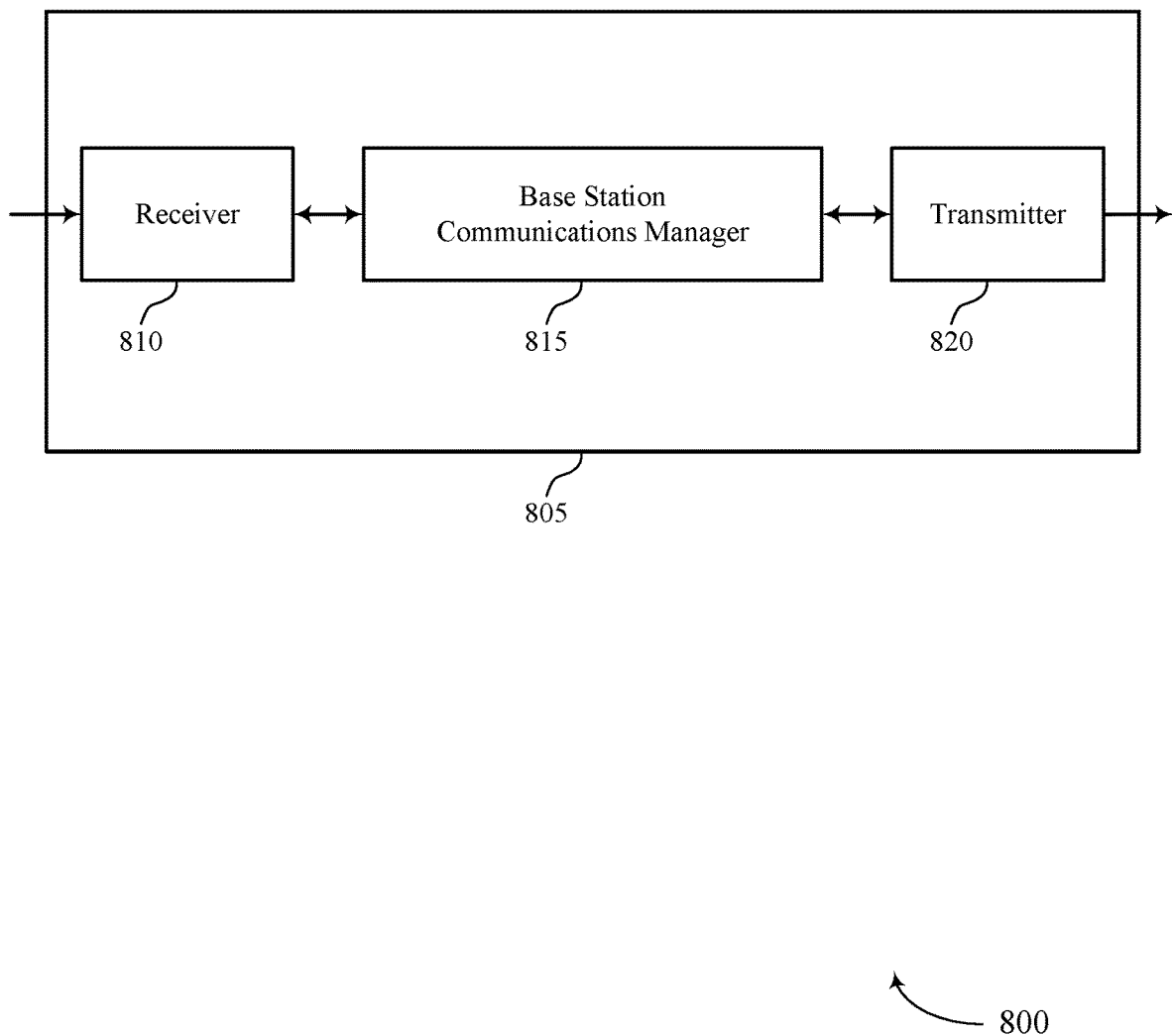
FIGS. 8 and 9 show block diagrams of devices that support a cross carrier random access configuration in accordance with aspects of the present disclosure.

FIG. 8 shows a block diagram 800 of a device 805 that supports cross carrier random access configuration in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to cross carrier random access configuration, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may identify a CA configuration for communicating with a UE, the CA configuration including a set of CCs in a TDD band and at least one FDD band. In some cases, the base station communications manager 815 may transmit a random access occasion configuration (e.g., RACH occasion configuration) scheduling a set of random access occasions (e.g., RACH occasions) for the set of CCs based on an SSB of the TDD band. Additionally, the base station communications manager 815 may receive a first random access message (e.g., first RACH message) for a CC in a random access occasion of the set of random access occasions based on the random access occasion configuration. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
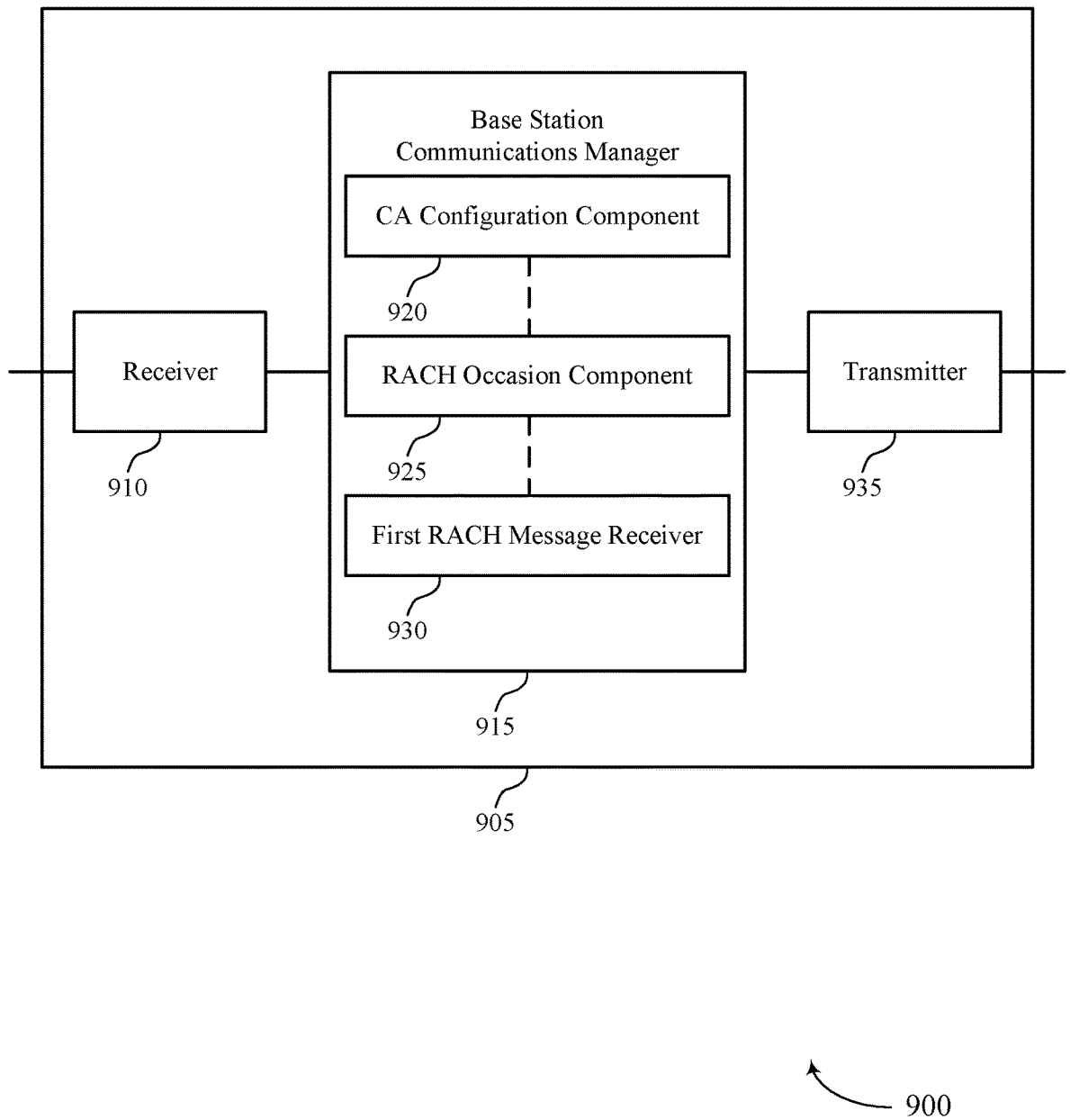

FIG. 9 shows a block diagram 900 of a device 905 that supports cross carrier random access configuration in accordance with aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to cross carrier random access configuration, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a CA configuration component 920, a RACH occasion component 925, and a first RACH message receiver 930. The base station communications manager 915 may be an example of aspects of the base station communications manager 1110 described herein.

The CA configuration component 920 may identify a CA configuration for communicating with a UE, the CA configuration including a set of CCs in a TDD band and at least one FDD band.

The RACH occasion component 925 may transmit a random access occasion configuration (e.g., RACH occasion configuration) scheduling a set of random access occasions (e.g., RACH occasions) for the set of CCs based on an SSB of the TDD band.

The first RACH message receiver 930 may receive a first random access message (e.g., first RACH message) for a CC in a random access occasion of the set of random access occasions based on the random access occasion configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
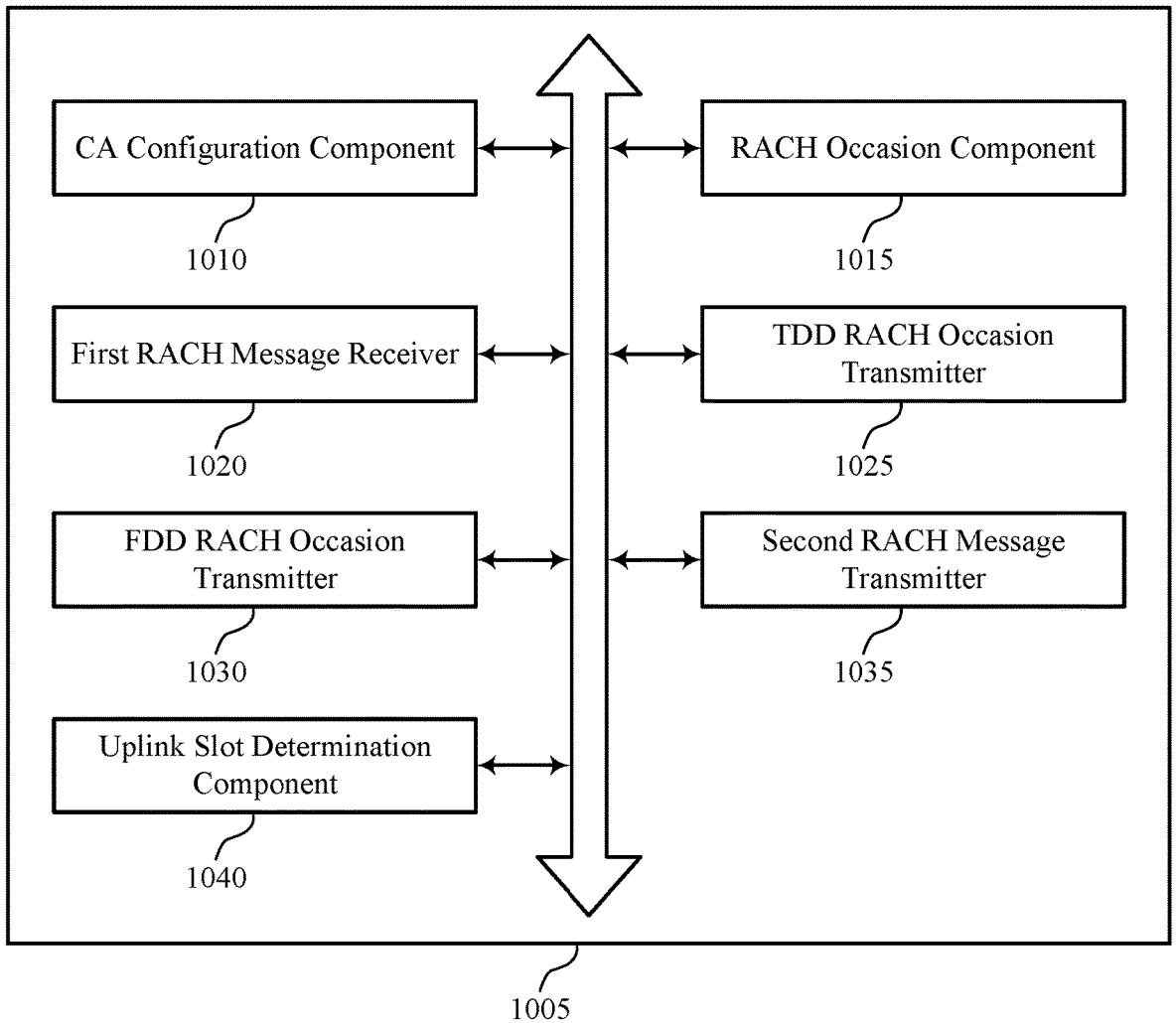
FIG. 10 shows a block diagram of a base station communications manager that supports a cross carrier random access configuration in accordance with aspects of the present disclosure.

FIG. 10 shows a block diagram 1000 of a base station communications manager 1005 that supports cross carrier random access configuration in accordance with aspects of the present disclosure. The base station communications manager 1005 may be an example of aspects of a base station communications manager 815, a base station communications manager 915, or a base station communications manager 1110 described herein. The base station communications manager 1005 may include a CA configuration component 1010, a RACH occasion component 1015, a first RACH message receiver 1020, a TDD RACH occasion transmitter 1025, a FDD RACH occasion transmitter 1030, a second RACH message transmitter 1035, and an uplink slot determination component 1040. Each of these modules may communicate, directly or indirectly, with one another (e.g., via one or more buses).

The CA configuration component 1010 may identify a CA configuration for communicating with a UE, the CA configuration including a set of CCs in a TDD band and at least one FDD band.

The RACH occasion component 1015 may transmit a random access occasion configuration (e.g., RACH occasion configuration) scheduling a set of random access occasions (e.g., RACH occasions) for the set of CCs based on an SSB of the TDD band. In some cases, the random access occasion configuration may include a frequency configuration for the set of random access occasions, a time configuration for the set of random access occasions, a sequence configuration for the set of random access occasions, or a combination thereof.

The first RACH message receiver 1020 may receive a first random access message (e.g., first RACH message) for a CC in a random access occasion of the set of random access occasions based on the random access occasion configuration. In some examples, the first RACH message receiver 1020 may transmit a MAC CE that includes an RA-RNTI. Additionally, the first RACH message receiver 1020 may transmit a list of available and unavailable random access occasions within the MAC CE and may receive the first random access message a second time based on the list of available and unavailable random access occasions.

The TDD RACH occasion transmitter 1025 may transmit the random access occasion configuration in the TDD band, where the set of random access occasions are configured in at least a CC of the at least one FDD band, the TDD band, or a combination thereof. In some examples, the TDD RACH occasion transmitter 1025 may transmit carrier information which indicates which CCs are used for the set of random access occasions. Additionally, the TDD RACH occasion transmitter 1025 may transmit the random access occasion configuration via an RRC configuration for system information, a DCI configuration for a random access procedure (e.g., RACH procedure), or a combination thereof.

The FDD RACH occasion transmitter 1030 may transmit the random access occasion configuration in the at least one FDD band, where one or more random access occasions of the set of random access occasions are configured in an uplink CC of the at least one FDD band, the TDD band, or a combination thereof. In some examples, the FDD RACH occasion transmitter 1030 may determine the uplink CC based on the SSB of the TDD band, an additional SSB of a different CC than the uplink CC, or a combination thereof. Additionally, the FDD RACH occasion transmitter 1030 may transmit CC information which indicates which corresponding CCs of the uplink CC are configured with the one or more random access occasions in the at least one FDD band.

The second RACH message transmitter 1035 may transmit a second random access message (e.g., second RACH message, RAR, etc.) based on receiving the first random access message. In some cases, the second random access message may be transmitted on an uplink CC that is paired with the TDD band or the at least one FDD band based on the CC on which the first random access message is received.

The uplink slot determination component 1040 may determine one or more available uplink slots for the UE to transmit the first random access message and may transmit an indication of an uplink slot of the one or more available uplink slots. Additionally or alternatively, the uplink slot determination component 1040 may transmit a TDM pattern for the UE to transmit the first random access message, where the first random access message is received based on the TDM pattern. Accordingly, the uplink slot determination component 1040 may receive the first random access message a second time based on the TDM pattern. In some cases, the TDM pattern may be transmitted via an RRC message, a DCI configuration, or a combination thereof.

Figure 11:
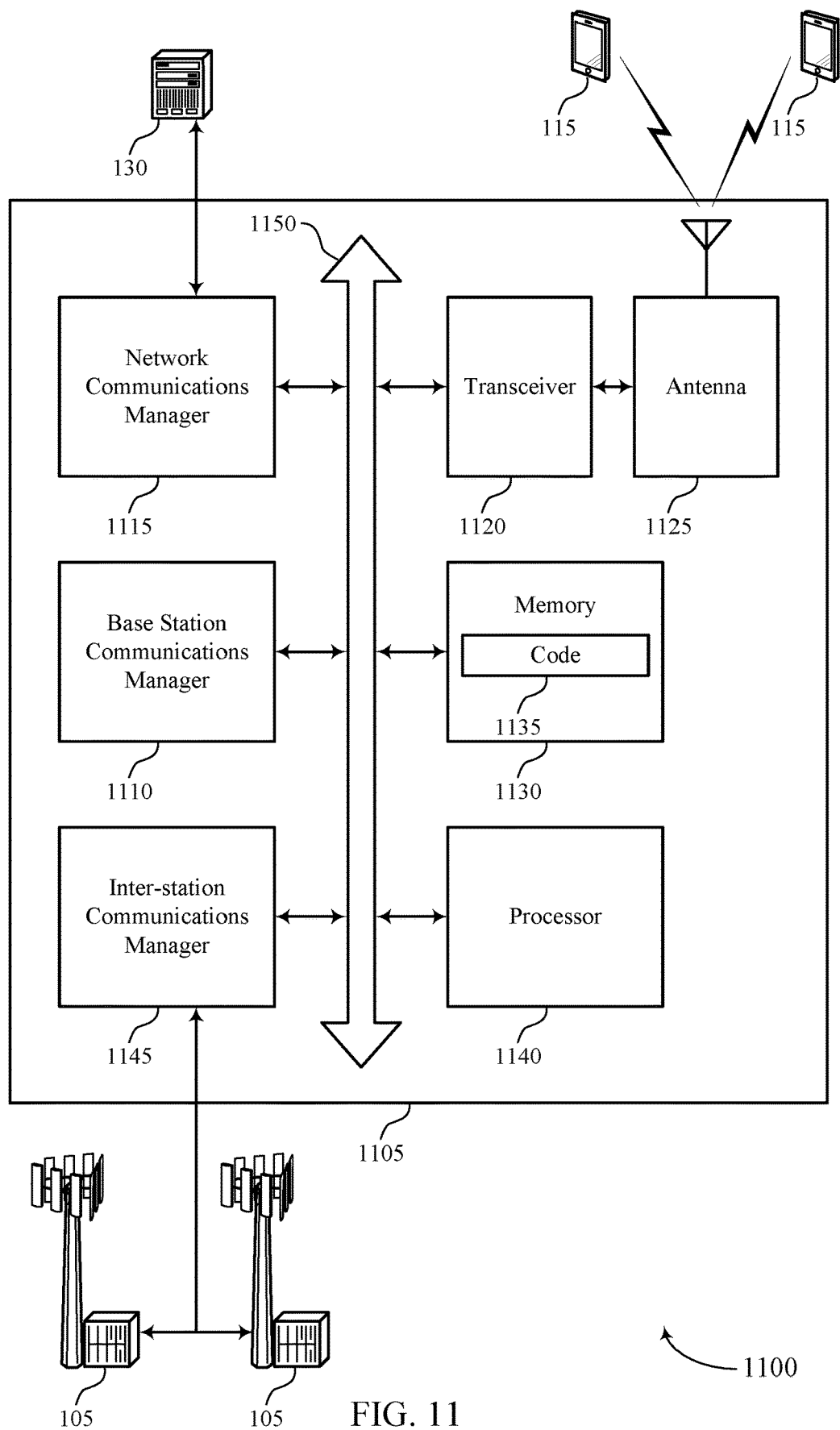
FIG. 11 shows a diagram of a system including a device that supports a cross carrier random access configuration in accordance with aspects of the present disclosure.

FIG. 11 shows a diagram of a system 1100 including a device 1105 that supports cross carrier random access configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be coupled via one or more buses (e.g., bus 1150).

The base station communications manager 1110 may identify a CA configuration for communicating with a UE, the CA configuration including a set of CCs in a TDD band and at least one FDD band. In some cases, the base station communications manager 1110 may transmit a random access occasion configuration scheduling a set of random access occasions for the set of CCs based on an SSB of the TDD band. Additionally, the base station communications manager 1110 may receive a first random access message for a CC in a random access occasion of the set of random access occasions based on the random access occasion configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting cross carrier random access configuration).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
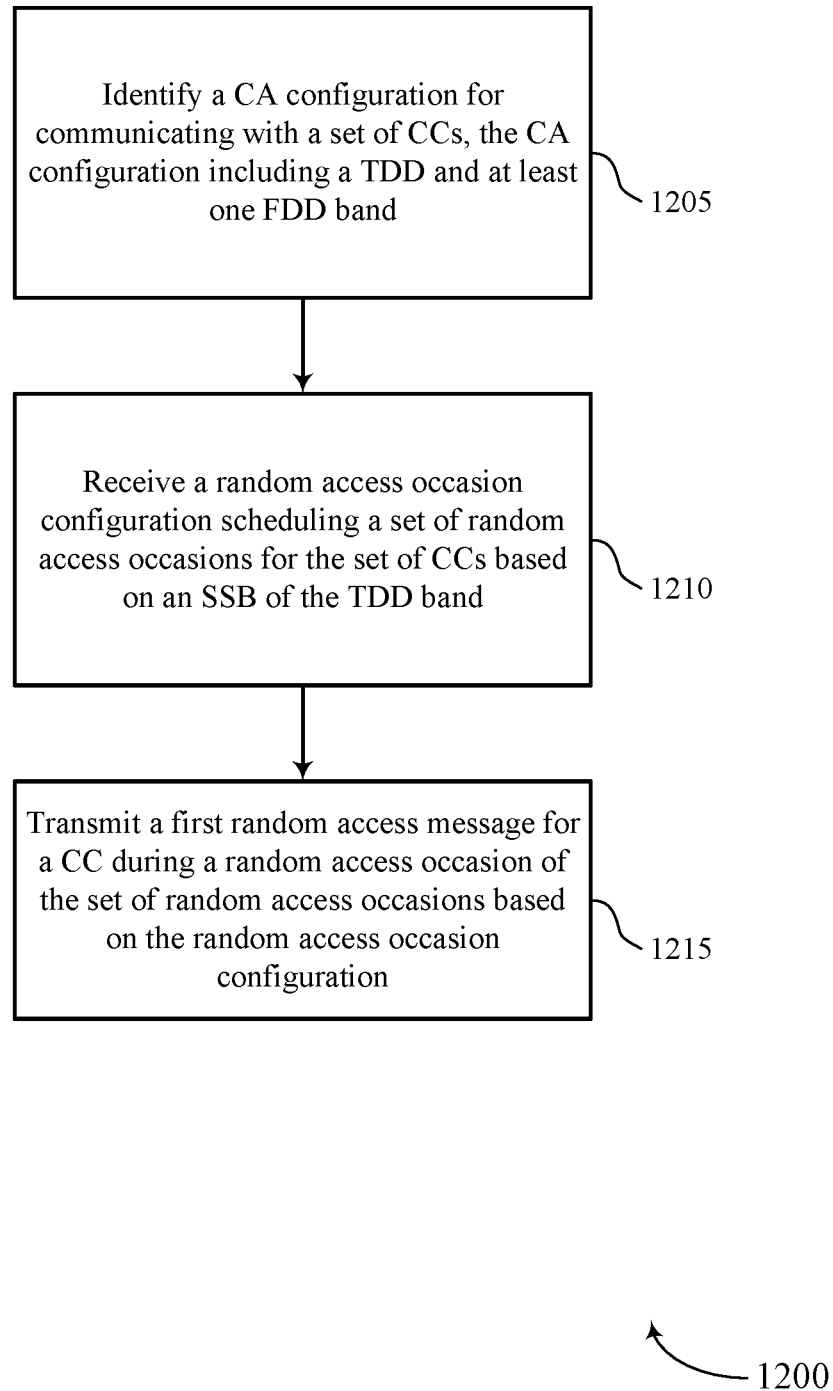
FIGS. 12 through 17 show flowcharts illustrating methods that support a cross carrier random access configuration in accordance with aspects of the present disclosure.

FIG. 12 shows a flowchart illustrating a method 1200 that supports cross carrier random access configuration in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a CA configuration for communicating with a set of CCs, the CA configuration including a TDD band and at least one FDD band. The operations of 1205 may be performed according to the methods described herein. In some examples, aspects of the operations of 1205 may be performed by a CA configuration identifier as described with reference to FIGS. 4 through 7.

At 1210, the UE may receive a random access occasion configuration scheduling a set of random access occasions for the set of CCs based on an SSB of the TDD band. The operations of 1210 may be performed according to the methods described herein. In some examples, aspects of the operations of 1210 may be performed by a RACH occasion configuration receiver as described with reference to FIGS. 4 through 7.

At 1215, the UE may transmit a first random access message for a CC during a random access occasion of the set of random access occasions based on the random access occasion configuration. The operations of 1215 may be performed according to the methods described herein. In some examples, aspects of the operations of 1215 may be performed by a first RACH message transmitter as described with reference to FIGS. 4 through 7.

Figure 13:
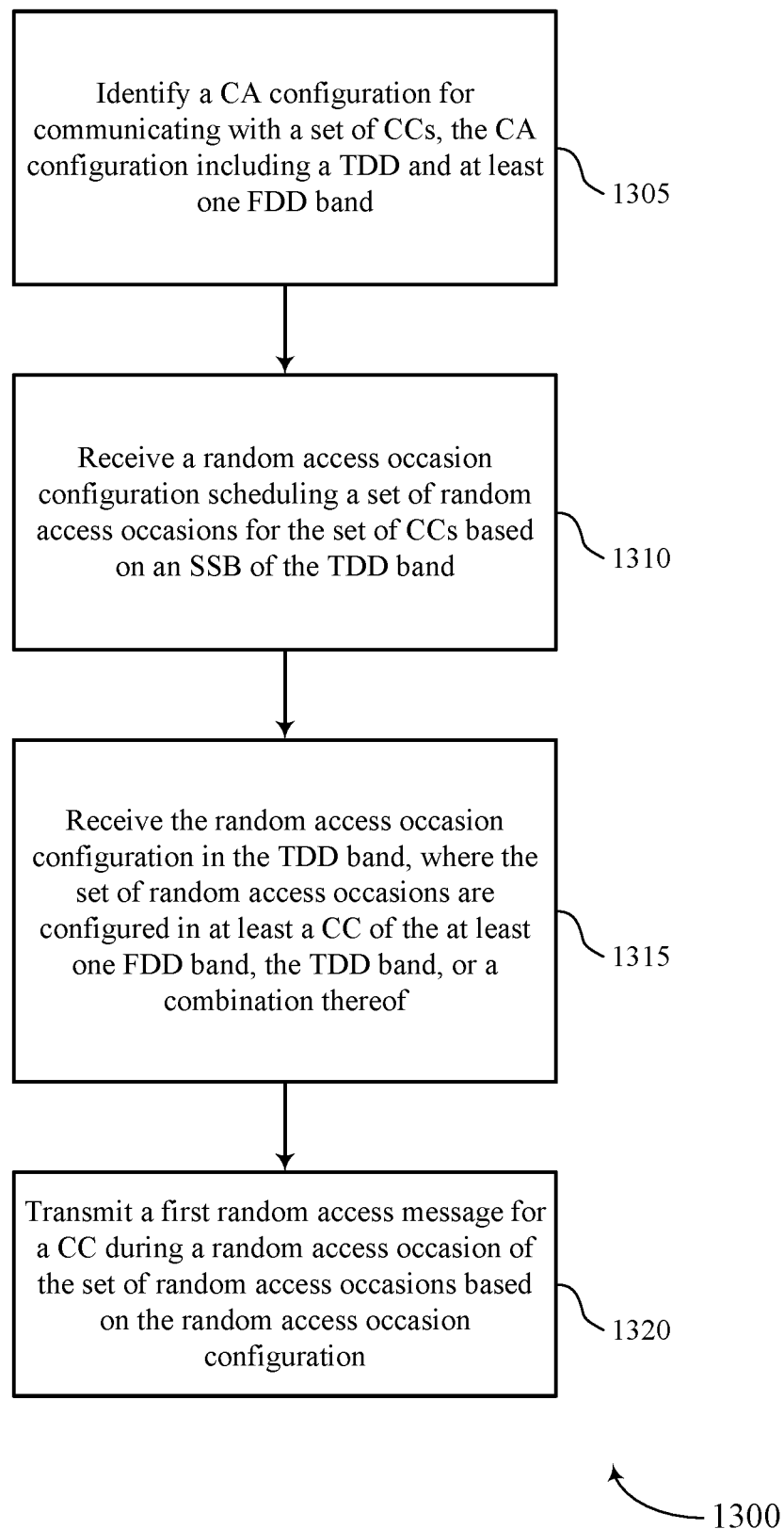

FIG. 13 shows a flowchart illustrating a method 1300 that supports cross carrier random access configuration in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify a CA configuration for communicating with a set of CCs, the CA configuration including a TDD band and at least one FDD band. The operations of 1305 may be performed according to the methods described herein. In some examples, aspects of the operations of 1305 may be performed by a CA configuration identifier as described with reference to FIGS. 4 through 7.

At 1310, the UE may receive a random access occasion configuration scheduling a set of random access occasions for the set of CCs based on an SSB of the TDD band. The operations of 1310 may be performed according to the methods described herein. In some examples, aspects of the operations of 1310 may be performed by a RACH occasion configuration receiver as described with reference to FIGS. 4 through 7.

At 1315, the UE may receive the random access occasion configuration in the TDD band, where the set of random access occasions are configured in at least a CC of the at least one FDD band, the TDD band, or a combination thereof. The operations of 1315 may be performed according to the methods described herein. In some examples, aspects of the operations of 1315 may be performed by a TDD RACH occasion component as described with reference to FIGS. 4 through 7.

At 1320, the UE may transmit a first random access message for a CC during a random access occasion of the set of random access occasions based on the random access occasion configuration. The operations of 1320 may be performed according to the methods described herein. In some examples, aspects of the operations of 1320 may be performed by a first RACH message transmitter as described with reference to FIGS. 4 through 7.

Figure 14:
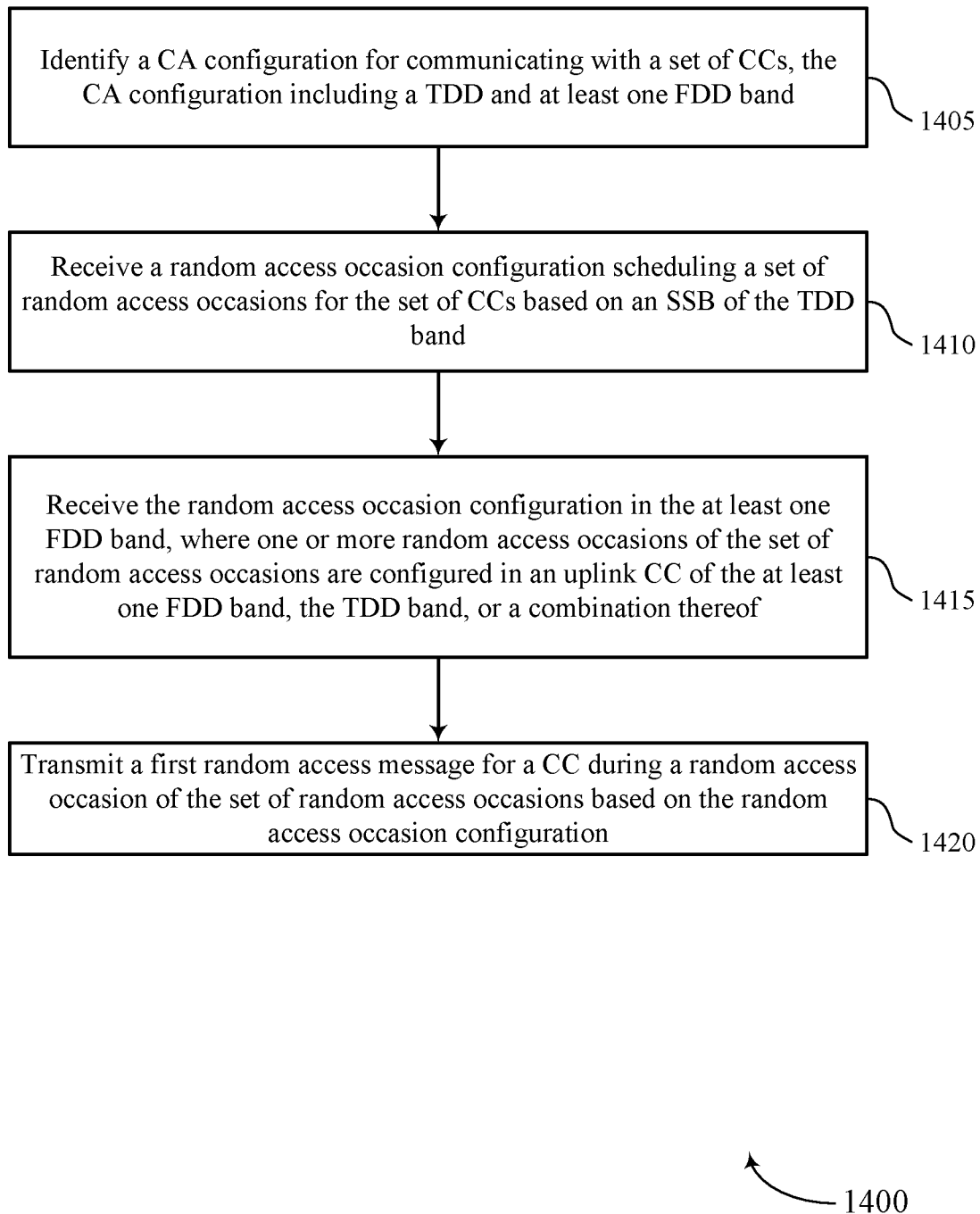

FIG. 14 shows a flowchart illustrating a method 1400 that supports cross carrier random access configuration in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may identify a CA configuration for communicating with a set of CCs, the CA configuration including a TDD band and at least one FDD band. The operations of 1405 may be performed according to the methods described herein. In some examples, aspects of the operations of 1405 may be performed by a CA configuration identifier as described with reference to FIGS. 4 through 7.

At 1410, the UE may receive a random access occasion configuration scheduling a set of random access occasions for the set of CCs based on an SSB of the TDD band. The operations of 1410 may be performed according to the methods described herein. In some examples, aspects of the operations of 1410 may be performed by a RACH occasion configuration receiver as described with reference to FIGS. 4 through 7.

At 1415, the UE may receive the random access occasion configuration in the at least one FDD band, where one or more random access occasions of the set of random access occasions are configured in an uplink CC of the at least one FDD band, the TDD band, or a combination thereof. The operations of 1415 may be performed according to the methods described herein. In some examples, aspects of the operations of 1415 may be performed by a FDD RACH occasion component as described with reference to FIGS. 4 through 7.

At 1420, the UE may transmit a first random access message for a CC during a random access occasion of the set of random access occasions based on the random access occasion configuration. The operations of 1420 may be performed according to the methods described herein. In some examples, aspects of the operations of 1420 may be performed by a first RACH message transmitter as described with reference to FIGS. 4 through 7.

Figure 15:
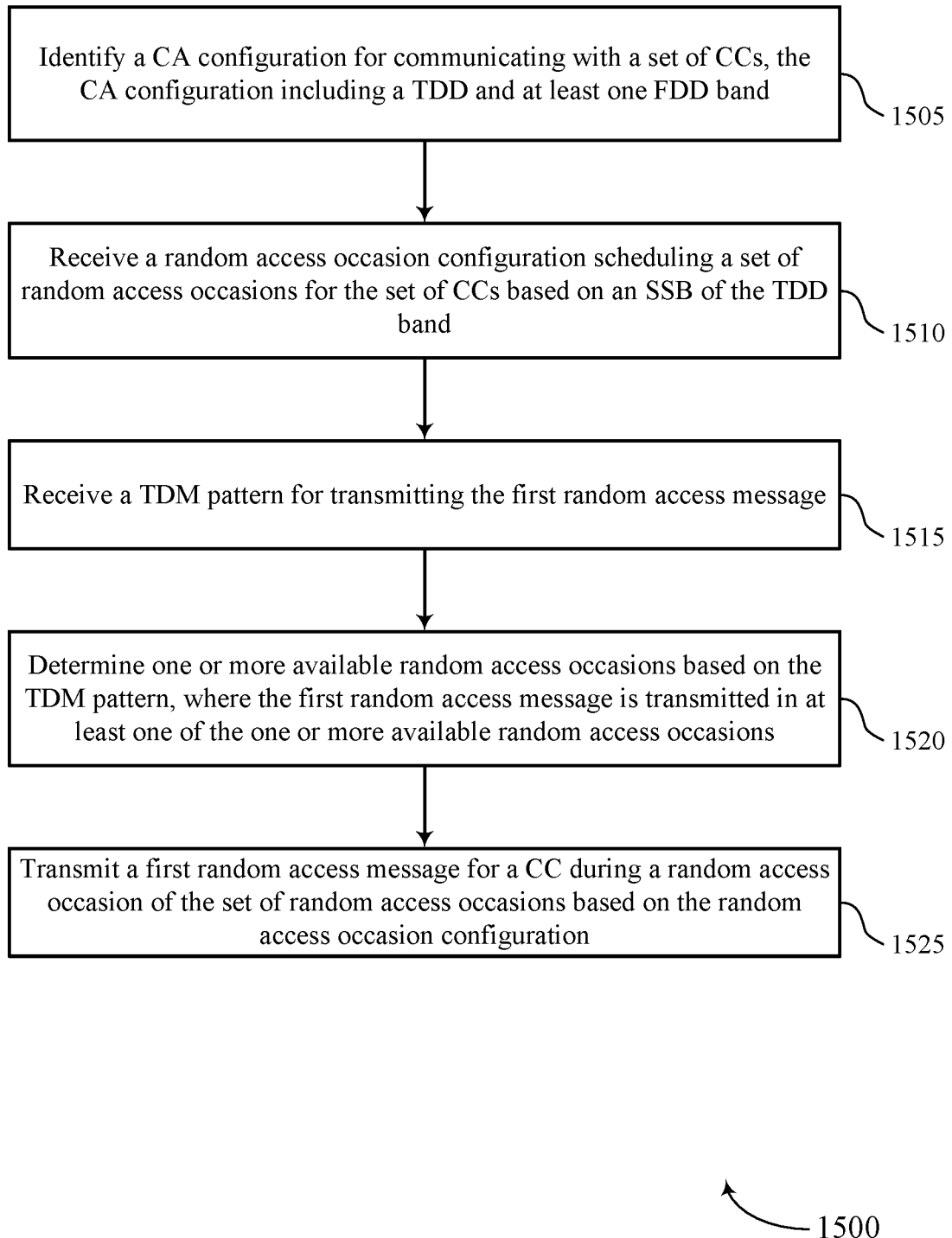

FIG. 15 shows a flowchart illustrating a method 1500 that supports cross carrier random access configuration in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may identify a CA configuration for communicating with a set of CCs, the CA configuration including a TDD band and at least one FDD band. The operations of 1505 may be performed according to the methods described herein. In some examples, aspects of the operations of 1505 may be performed by a CA configuration identifier as described with reference to FIGS. 4 through 7.

At 1510, the UE may receive a random access occasion configuration scheduling a set of random access occasions for the set of CCs based on an SSB of the TDD band. The operations of 1510 may be performed according to the methods described herein. In some examples, aspects of the operations of 1510 may be performed by a RACH occasion configuration receiver as described with reference to FIGS. 4 through 7.

At 1515, the UE may receive a TDM pattern for transmitting the first random access message. The operations of 1515 may be performed according to the methods described herein. In some examples, aspects of the operations of 1515 may be performed by a RACH occasion determination component as described with reference to FIGS. 4 through 7.

At 1520, the UE may determine one or more available random access occasions based on the TDM pattern, where the first random access message is transmitted in at least one of the one or more available random access occasions. The operations of 1520 may be performed according to the methods described herein. In some examples, aspects of the operations of 1520 may be performed by a RACH occasion determination component as described with reference to FIGS. 4 through 7.

At 1525, the UE may transmit a first random access message for a CC during a random access occasion of the set of random access occasions based on the random access occasion configuration. The operations of 1525 may be performed according to the methods described herein. In some examples, aspects of the operations of 1525 may be performed by a first RACH message transmitter as described with reference to FIGS. 4 through 7.

Figure 16:
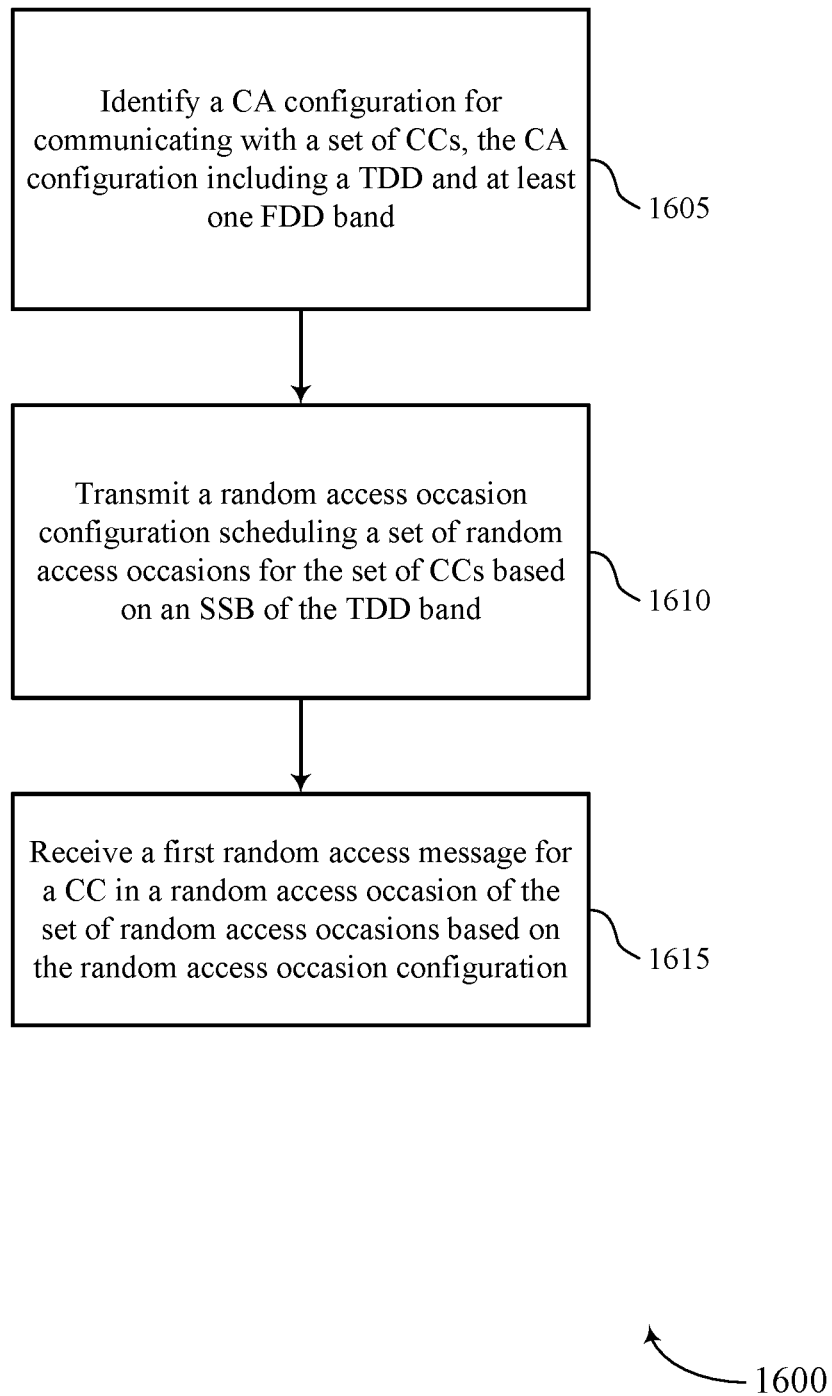

FIG. 16 shows a flowchart illustrating a method 1600 that supports cross carrier random access configuration in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may identify a CA configuration for communicating with a UE, the CA configuration including a set of CCs in a TDD band and at least one FDD band. The operations of 1605 may be performed according to the methods described herein. In some examples, aspects of the operations of 1605 may be performed by a CA configuration component as described with reference to FIGS. 8 through 11.

At 1610, the base station may transmit a random access occasion configuration scheduling a set of random access occasions for the set of CCs based on an SSB of the TDD band. The operations of 1610 may be performed according to the methods described herein. In some examples, aspects of the operations of 1610 may be performed by a RACH occasion component as described with reference to FIGS. 8 through 11.

At 1615, the base station may receive a first random access message for a CC in a random access occasion of the set of random access occasions based on the random access occasion configuration. The operations of 1615 may be performed according to the methods described herein. In some examples, aspects of the operations of 1615 may be performed by a first RACH message receiver as described with reference to FIGS. 8 through 11.

Figure 17:
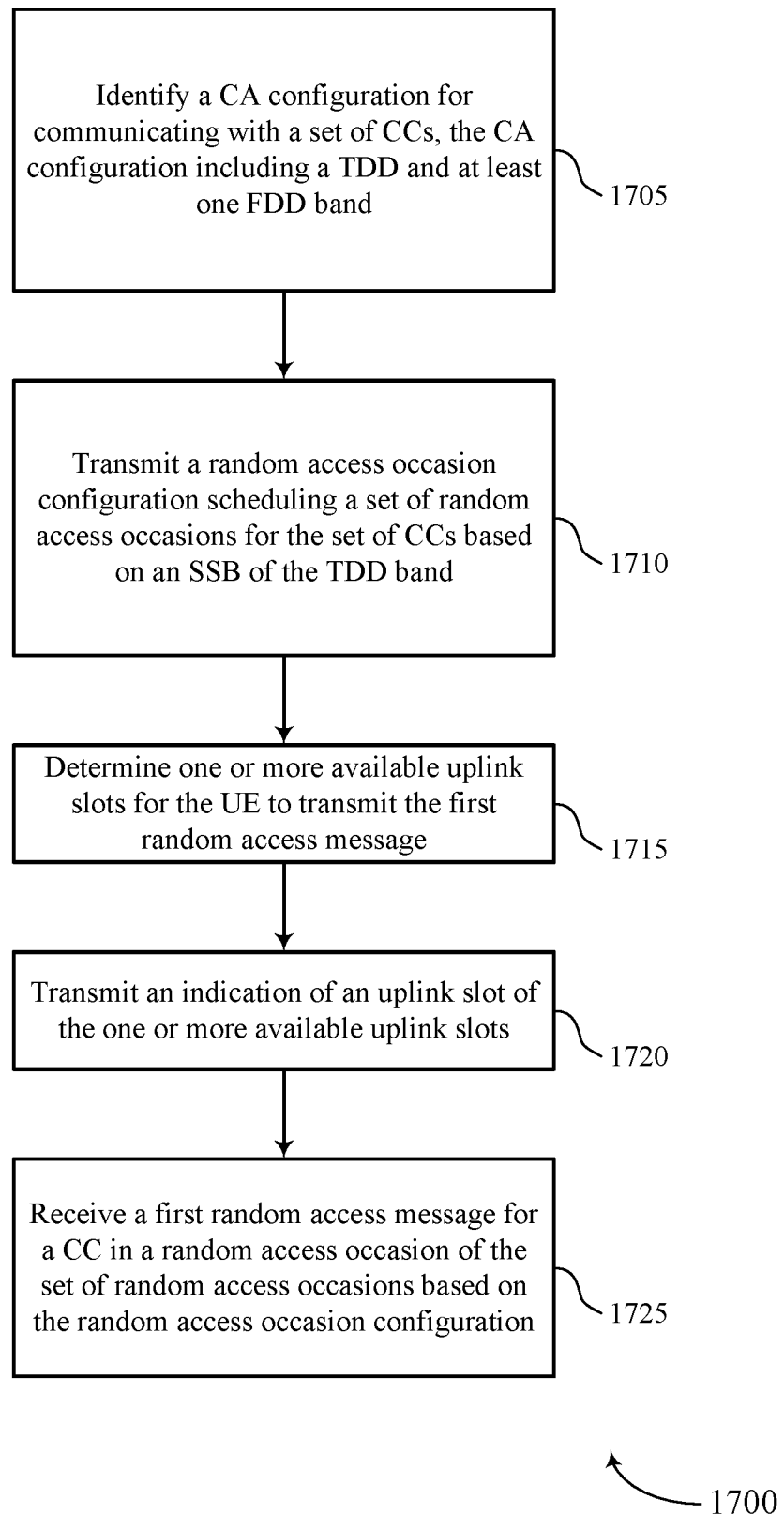

FIG. 17 shows a flowchart illustrating a method 1700 that supports cross carrier random access configuration in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may identify a CA configuration for communicating with a UE, the CA configuration including a set of CCs in a TDD band and at least one FDD band. The operations of 1705 may be performed according to the methods described herein. In some examples, aspects of the operations of 1705 may be performed by a CA configuration component as described with reference to FIGS. 8 through 11.

At 1710, the base station may transmit a random access occasion configuration scheduling a set of random access occasions for the set of CCs based on an SSB of the TDD band. The operations of 1710 may be performed according to the methods described herein. In some examples, aspects of the operations of 1710 may be performed by a RACH occasion component as described with reference to FIGS. 8 through 11.

At 1715, the base station may determine one or more available uplink slots for the UE to transmit the first random access message. The operations of 1715 may be performed according to the methods described herein. In some examples, aspects of the operations of 1715 may be performed by an uplink slot determination component as described with reference to FIGS. 8 through 11.

At 1720, the base station may transmit an indication of an uplink slot of the one or more available uplink slots. The operations of 1720 may be performed according to the methods described herein. In some examples, aspects of the operations of 1720 may be performed by an uplink slot determination component as described with reference to FIGS. 8 through 11.

At 1725, the base station may receive a first random access message for a CC in a random access occasion of the set of random access occasions based on the random access occasion configuration. The operations of 1725 may be performed according to the methods described herein. In some examples, aspects of the operations of 1725 may be performed by a first RACH message receiver as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communications at a user equipment (UE), comprising: identifying a carrier aggregation configuration for communicating with a plurality of component carriers, the carrier aggregation configuration comprising a time division duplexing band and at least one frequency division duplexing band; receiving a random access occasion configuration scheduling a plurality of random access occasions for the plurality of component carriers based at least in part on a synchronization signal/physical broadcast channel block of the time division duplexing band; and transmitting a first random access message for a component carrier during a random access occasion of the plurality of random access occasions based at least in part on the random access occasion configuration.

Example 2: The method of example 1, wherein receiving the random access occasion configuration comprises: receiving the random access occasion configuration in the time division duplexing band, wherein the plurality of random access occasions are configured in at least a component carrier of the at least one frequency division duplexing band, the time division duplexing band, or a combination thereof.

Example 3: The method of example 2, wherein receiving the random access occasion configuration further comprises: receiving carrier information which indicates which component carriers are used for the plurality of random access occasions.

Example 4: The method of any one of examples 2 through 3, wherein receiving the random access occasion configuration further comprises: receiving the random access occasion configuration via a radio resource control configuration for system information, a downlink control information configuration for a random access procedure, or a combination thereof.

Example 5: The method of any one of examples 1 through 4, wherein receiving the random access occasion configuration comprises: receiving the random access occasion configuration in the at least one frequency division duplexing band, wherein one or more random access occasions of the plurality of random access occasions are configured in an uplink component carrier of the at least one frequency division duplexing band, the time division duplexing band, or a combination thereof.

Example 6: The method of example 5, further comprising: determining the uplink component carrier based at least in part on the synchronization signal/physical broadcast channel block of the time division duplexing band, an additional synchronization signal/physical broadcast channel block of a different component carrier than the uplink component carrier, or a combination thereof.

Example 7: The method of any one of examples 5 through 6, wherein receiving the random access occasion configuration further comprises: receiving component carrier information which indicates which corresponding component carriers of the uplink component carrier are configured with the one or more random access occasions in the at least one frequency division duplexing band.

Example 8: The method of any one of examples 1 through 7, wherein the random access occasion configuration comprises a frequency configuration for the plurality of random access occasions, a time configuration for the plurality of random access occasions, a sequence configuration for the plurality of random access occasions, or a combination thereof.

Example 9: The method of any one of examples 1 through 8, further comprising: receiving a second random access message based at least in part on transmitting the first random access message.

Example 10: The method of example 9, further comprising: determining a propagation delay based at least in part on the component carrier on which the first random access message is transmitted and an additional component carrier on which the second random access message is received; and monitoring a time window for the second random access message based at least in part on the propagation delay.

Example 11: The method of example 10, wherein the propagation delay is determined based on a first timing advance group for the component carrier and a second timing advance group for the additional component carrier, the first timing advance group being the same or different than the second timing advance group.

Example 12: The method of any one of examples 9 through 11, wherein the second random access message is received on an uplink component carrier that is paired with the time division duplexing band or the at least one frequency division duplexing band based at least in part on the component carrier on which the first random access message is transmitted.

Example 13: The method of any one of examples 1 through 12, further comprising: measuring a signal quality of a downlink component carrier that corresponds to the component carrier used for transmitting the first random access message; and determining a transmit power for transmitting the first random access message based at least in part on the measured signal quality.

Example 14: The method of example 13, wherein the downlink component carrier is in the time division duplexing band or the at least one frequency division duplexing band.

Example 15: The method of any one of examples 1 through 14, further comprising: receiving an indication of an uplink slot for transmitting the first random access message.

Example 16: The method of any one of examples 1 through 15, further comprising: receiving a time division multiplexing pattern for transmitting the first random access message; and determining one or more available random access occasions based at least in part on the time division multiplexing pattern, wherein the first random access message is transmitted in at least one of the one or more available random access occasions.

Example 17: The method of example 16, further comprising: determining to retransmit the first random access message; and transmitting the first random access message a second time based at least in part on the determination to retransmit and the time division multiplexing pattern.

Example 18: The method of any one of examples 16 through 17, wherein the time division multiplexing pattern is received via a radio resource control message, a downlink control information configuration, or a combination thereof.

Example 19: The method of any one of examples 1 through 18, further comprising: receiving a medium access control (MAC) control element that includes a random access radio network temporary identifier; receiving a list of available and unavailable random access occasions within the MAC control element; determining a backoff timer and a retransmission configuration for the first random access message based at least in part on the list of available and unavailable random access occasions; and transmitting the first random access message a second time based at least in part on the backoff timer and the retransmission configuration.

Example 20: A method for wireless communications at a base station, comprising: identifying a carrier aggregation configuration for communicating with a user equipment (UE), the carrier aggregation configuration comprising a plurality of component carriers in a time division duplexing band and at least one frequency division duplexing band; transmitting a random access occasion configuration scheduling a plurality of random access occasions for the plurality of component carriers based at least in part on a synchronization signal/physical broadcast channel block of the time division duplexing band; and receiving a first random access message for a component carrier in a random access occasion of the plurality of random access occasions based at least in part on the random access occasion configuration.

Example 21: The method of example 20, wherein transmitting the random access occasion configuration comprises: transmitting the random access occasion configuration in the time division duplexing band, wherein the plurality of random access occasions are configured in at least a component carrier of the at least one frequency division duplexing band, the time division duplexing band, or a combination thereof.

Example 22: The method of example 21, wherein transmitting the random access occasion configuration comprises: transmitting carrier information which indicates which component carriers are used for the plurality of random access occasions.

Example 23: The method of any one of examples 21 through 22, wherein transmitting the random access occasion configuration comprises: transmitting the random access occasion configuration via a radio resource control configuration for system information, a downlink control information configuration for a random access procedure, or a combination thereof.

Example 24: The method of any one of examples 20 through 23, wherein transmitting the random access occasion configuration comprises: transmitting the random access occasion configuration in the at least one frequency division duplexing band, wherein one or more random access occasions of the plurality of random access occasions are configured in an uplink component carrier of the at least one frequency division duplexing band, the time division duplexing band, or a combination thereof.

Example 25: The method of example 24, further comprising: determining the uplink component carrier based at least in part on the synchronization signal/physical broadcast channel block of the time division duplexing band, an additional synchronization signal/physical broadcast channel block of a different component carrier than the uplink component carrier, or a combination thereof.

Example 26: The method of any one of examples 24 through 25, wherein transmitting the random access occasion configuration comprises: transmitting component carrier information which indicates which corresponding component carriers of the uplink component carrier are configured with the one or more random access occasions in the at least one frequency division duplexing band.

Example 27: The method of any one of examples 20 through 26, wherein

Example 28: The method of any one of examples 20 through 27, further comprising: transmitting a second random access message based at least in part on receiving the first random access message.

Example 29: The method of example 28, wherein the random access occasion configuration comprises a frequency configuration for the plurality of random access occasions, a time configuration for the plurality of random access occasions, a sequence configuration for the plurality of random access occasions, or a combination thereof.

Example 30: The method of any one of examples 20 through 29, further comprising: determining one or more available uplink slots for the UE to transmit the first random access message; and transmitting an indication of an uplink slot of the one or more available uplink slots.

Example 31: The method of any one of examples 20 through 30, further comprising: transmitting a time division multiplexing pattern for the UE to transmit the first random access message, wherein the first random access message is received based at least in part on the time division multiplexing pattern.

Example 32: The method of example 31, further comprising: receiving the first random access message a second time based at least in part on the time division multiplexing pattern.

Example 33: The method of any one of examples 31 through 32, wherein the time division multiplexing pattern is transmitted via a radio resource control message, a downlink control information configuration, or a combination thereof.

Example 34: The method of any one of examples 20 through 33, further comprising: transmitting a medium access control (MAC) control element that includes a random access radio network temporary identifier; transmitting a list of available and unavailable random access occasions within the MAC control element; and receiving the first random access message a second time based at least in part on the list of available and unavailable random access occasions.

Example 35: An apparatus for wireless communications at a user equipment (UE) comprising at least one means for performing a method of any one of examples 1 through 19.

Example 36: An apparatus for wireless communications at a user equipment (UE) comprising a processor and memory coupled to the processor, the processor and memory configured to perform a method of any one of examples 1 through 19.

Example 38: A non-transitory computer-readable medium storing code for wireless communications at a user equipment (UE), the code comprising instructions executable by a processor to perform a method of any one of examples 1 through 19.

Example 39: An apparatus for wireless communications at a base station comprising at least one means for performing a method of any one of examples 20 through 34.

Example 40: An apparatus for wireless communications at a base station comprising a processor and memory coupled to the processor, the processor and memory configured to perform a method of any one of examples 20 through 34.

Example 42: A non-transitory computer-readable medium storing code for wireless communications at a base station, the code comprising instructions executable by a processor to perform a method of any one of examples 20 through 34.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a carrier aggregation configuration for communicating with a plurality of component carriers, the carrier aggregation configuration comprising a time division duplexing band and at least one frequency division duplexing band;
   receiving a random access occasion configuration scheduling a plurality of random access occasions for the plurality of component carriers, the scheduled plurality of random access occasions comprising at least one random access occasion in the at least one frequency division duplexing band based at least in part on a synchronization signal/physical broadcast channel block of the time division duplexing band; and
   transmitting a first random access message for a component carrier during a random access occasion of the plurality of random access occasions based at least in part on the random access occasion configuration.

2. The method of claim 1, wherein receiving the random access occasion configuration comprises:
   receiving the random access occasion configuration in the time division duplexing band, wherein the plurality of random access occasions are configured in at least a component carrier of the at least one frequency division duplexing band or a combination of the at least one frequency division duplexing band and the time division duplexing band.

3. The method of claim 2, wherein receiving the random access occasion configuration further comprises:
   receiving carrier information which indicates which component carriers are used for the plurality of random access occasions.

4. The method of claim 2, wherein receiving the random access occasion configuration further comprises:
   receiving the random access occasion configuration via a radio resource control configuration for system information, a downlink control information configuration for a random access procedure, or a combination thereof.

5. The method of claim 1, wherein receiving the random access occasion configuration comprises:
   receiving the random access occasion configuration in the at least one frequency division duplexing band, wherein one or more random access occasions of the plurality of random access occasions are configured in an uplink component carrier of the at least one frequency division duplexing band or a combination of the at least one frequency division duplexing band and the time division duplexing band.

6. The method of claim 5, further comprising:
   determining the uplink component carrier based at least in part on the synchronization signal/physical broadcast channel block of the time division duplexing band, an additional synchronization signal/physical broadcast channel block of a different component carrier than the uplink component carrier, or a combination thereof.

7. The method of claim 5, wherein receiving the random access occasion configuration further comprises:
   receiving component carrier information which indicates which corresponding component carriers of the uplink component carrier are configured with the one or more random access occasions in the at least one frequency division duplexing band.

8. The method of claim 1, wherein the random access occasion configuration comprises a frequency configuration for the plurality of random access occasions, a time configuration for the plurality of random access occasions, a sequence configuration for the plurality of random access occasions, or a combination thereof.

9. The method of claim 1, further comprising:
   receiving a second random access message based at least in part on transmitting the first random access message.

10. The method of claim 9, further comprising:
    determining a propagation delay based at least in part on the component carrier on which the first random access message is transmitted and an additional component carrier on which the second random access message is received; and
    monitoring a time window for the second random access message based at least in part on the propagation delay.

11. The method of claim 10, wherein the propagation delay is determined based on a first timing advance group for the component carrier and a second timing advance group for the additional component carrier, the first timing advance group being the same or different than the second timing advance group.

12. The method of claim 9, wherein the second random access message is received on an uplink component carrier that is paired with the time division duplexing band or the at least one frequency division duplexing band based at least in part on the component carrier on which the first random access message is transmitted.

13. The method of claim 1, further comprising:
    measuring a signal quality of a downlink component carrier that corresponds to the component carrier used for transmitting the first random access message; and
    determining a transmit power for transmitting the first random access message based at least in part on the measured signal quality.

14. The method of claim 13, wherein the downlink component carrier is in the time division duplexing band or the at least one frequency division duplexing band.

15. The method of claim 1, further comprising:
    receiving an indication of an uplink slot for transmitting the first random access message.

16. The method of claim 1, further comprising:
    receiving a time division multiplexing pattern for transmitting the first random access message; and
    determining one or more available random access occasions based at least in part on the time division multiplexing pattern, wherein the first random access message is transmitted in at least one of the one or more available random access occasions.

17. The method of claim 16, further comprising:
    determining to retransmit the first random access message; and
    transmitting the first random access message a second time based at least in part on the determination to retransmit and the time division multiplexing pattern.

18. The method of claim 16, wherein the time division multiplexing pattern is received via a radio resource control message, a downlink control information configuration, or a combination thereof.

19. The method of claim 1, further comprising:
    receiving a medium access control (MAC) control element that includes a random access radio network temporary identifier;
    receiving a list of available and unavailable random access occasions within the MAC control element;

determining a backoff timer and a retransmission configuration for the first random access message based at least in part on the list of available and unavailable random access occasions; and transmitting the first random access message a second time based at least in part on the backoff timer and the retransmission configuration.

20. A method for wireless communications at a base station, comprising:

identifying a carrier aggregation configuration for communicating with a user equipment (UE), the carrier aggregation configuration comprising a plurality of component carriers in a time division duplexing band and at least one frequency division duplexing band;

transmitting a random access occasion configuration scheduling a plurality of random access occasions for the plurality of component carriers, the scheduled plurality of random access occasions comprising at least one random access occasion in the at least one frequency division duplexing band based at least in part on a synchronization signal/physical broadcast channel block of the time division duplexing band; and receiving a first random access message for a component carrier in a random access occasion of the plurality of random access occasions based at least in part on the random access occasion configuration.

21. The method of claim 20, wherein transmitting the random access occasion configuration comprises:

transmitting the random access occasion configuration in the time division duplexing band, wherein the plurality of random access occasions are configured in at least a component carrier of the at least one frequency division duplexing band or a combination of the at least one frequency division duplexing band and the time division duplexing band.

22. The method of claim 21, wherein transmitting the random access occasion configuration comprises:

transmitting carrier information which indicates which component carriers are used for the plurality of random access occasions.

23. The method of claim 21, wherein transmitting the random access occasion configuration comprises:

transmitting the random access occasion configuration via a radio resource control configuration for system information, a downlink control information configuration for a random access procedure, or a combination thereof.

24. The method of claim 20, wherein transmitting the random access occasion configuration comprises:

transmitting the random access occasion configuration in the at least one frequency division duplexing band, wherein one or more random access occasions of the plurality of random access occasions are configured in an uplink component carrier of the at least one frequency division duplexing band or a combination of the at least one frequency division duplexing band and the time division duplexing band.

25. The method of claim 24, further comprising:

determining the uplink component carrier based at least in part on the synchronization signal/physical broadcast channel block of the time division duplexing band, an additional synchronization signal/physical broadcast channel block of a different component carrier than the uplink component carrier, or a combination thereof.

26. The method of claim 24, wherein transmitting the random access occasion configuration comprises:

transmitting component carrier information which indicates which corresponding component carriers of the uplink component carrier are configured with the one or more random access occasions in the at least one frequency division duplexing band.

27. The method of claim 20, further comprising:

transmitting a second random access message based at least in part on receiving the first random access message.

28. The method of claim 20, further comprising:

determining one or more available uplink slots for the UE to transmit the first random access message; and transmitting an indication of an uplink slot of the one or more available uplink slots.

29. An apparatus for wireless communications at a user equipment (UE), comprising:

a processor, memory coupled with the processor, and instructions stored in the memory and executable by the processor to cause the apparatus to:

identify a carrier aggregation configuration for communicating with a plurality of component carriers, the carrier aggregation configuration comprising a time division duplexing band and at least one frequency division duplexing band;

receive a random access occasion configuration scheduling a plurality of random access occasions for the plurality of component, the scheduled plurality of random access occasions comprising at least one random access occasion in the at least one frequency division duplexing band based at least in part on a synchronization signal/physical broadcast channel block of the time division duplexing band; and transmit a first random access message for a component carrier during a random access occasion of the plurality of random access occasions based at least in part on the random access occasion configuration.

30. An apparatus for wireless communications at a base station, comprising:

a processor, memory coupled with the processor; and instructions stored in the memory and executable by the processor to cause the apparatus to:

identify a carrier aggregation configuration for communicating with a user equipment (UE), the carrier aggregation configuration comprising a plurality of component carriers in a time division duplexing band and at least one frequency division duplexing band;

transmit a random access occasion configuration scheduling a plurality of random access occasions for the plurality of component carriers, the scheduled plurality of random access occasions comprising at least one random access occasion in the at least one frequency division duplexing band based at least in part on a synchronization signal/physical broadcast channel block of the time division duplexing band; and receive a first random access message for a component carrier in a random access occasion of the plurality of random access occasions based at least in part on the random access occasion configuration.

* * * * *